US012753316B2

(12) United States Patent
Kondo et al.

(10) Patent No.: US 12,753,316 B2
(45) Date of Patent: Oct. 6, 2026

(54) FILM AND METHOD OF PRODUCING THE SAME

(71) Applicant: 3M INNOVATIVE PROPERTIES COMPANY, St. Paul, MN (US)

(72) Inventors: Shinsuke Kondo, Yamagata (JP); Tatsuya Sato, Yamagata (JP); Naota Sugiyama, St. Paul, MN (US); Masaaki Furusawa, Yamagata (JP); Koji Saito, Yamagata, MN (US); Tomohiro Oba, Yamagata (JP); Keisuke Kato, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 464 days.

(21) Appl. No.: 18/014,821

(22) PCT Filed: Jun. 29, 2021

(86) PCT No.: PCT/IB2021/055816
§ 371 (c)(1),
(2) Date: Jan. 6, 2023

(87) PCT Pub. No.: WO2022/009022
PCT Pub. Date: Jan. 13, 2022

(65) Prior Publication Data

US 2023/0323144 A1 Oct. 12, 2023

(30) Foreign Application Priority Data

Jul. 7, 2020 (JP) ................................ 2020-117300

(51) Int. Cl.
*C09D 11/107* (2014.01)
*B32B 3/30* (2006.01)
(Continued)

(52) U.S. Cl.
CPC .............. *C09D 11/107* (2013.01); *B32B 3/30* (2013.01); *B32B 7/023* (2019.01); *B32B 27/08* (2013.01);
(Continued)

(58) Field of Classification Search
CPC ..... C09D 11/107; C09D 11/104; B32B 7/023; B32B 3/30; B32B 27/08; B32B 27/304;
(Continued)

(56) References Cited

U.S. PATENT DOCUMENTS

2015/0166844 A1* 6/2015 Clarke .................... B29B 11/12 264/293
2018/0215122 A1 8/2018 Oshima et al.
(Continued)

FOREIGN PATENT DOCUMENTS

JP 61293854 A 12/1986
JP 02128843 A 5/1990
(Continued)

OTHER PUBLICATIONS

International Search Report for PCT International Application No. PCT/IB2021/055816, mailed on Sep. 14, 2021, 4 pages.

*Primary Examiner* — Travis M Figg
(74) *Attorney, Agent, or Firm* — Lance Vietzke

(57) ABSTRACT

Provided is a film that has high-quality low gloss appearance with a small change in appearance of texture as observed at various viewing angles and that has tactile texture. Solution means A film of an embodiment is a film including a surface layer embossed, wherein the surface layer includes a low gloss layer and a gloss printed pattern partially covering the low gloss layer, (1) 85-degree surface glossiness of the surface layer is less than or equal to 3.5 GU as an in-plane average value; (2) 485-degree surface glossiness defined by a difference between an in-plane maximum value of the
(Continued)

85-degree surface glossiness and the in-plane average value of the 85-degree surface glossiness of the surface layer (=in-plane maximum value of 85-degree surface glossiness—in-plane average value of 85-degree surface glossiness) is from 0.2 to 2.5, and (3) surface roughness Ra of an embossed surface of the film is greater than or equal to 3.5 μm.

14 Claims, 6 Drawing Sheets

(51) Int. Cl.

| | |
|---|---|
| ***B32B 7/023*** | (2019.01) |
| ***B32B 27/08*** | (2006.01) |
| ***B32B 27/30*** | (2006.01) |
| ***B44F 1/02*** | (2006.01) |
| ***B44F 9/02*** | (2006.01) |
| ***C09D 11/104*** | (2014.01) |
| ***E04F 13/00*** | (2006.01) |

(52) U.S. Cl.
CPC .............. *B32B 27/304* (2013.01); *B44F 1/02* (2013.01); *C09D 11/104* (2013.01); *E04F 13/002* (2013.01); *B32B 2250/02* (2013.01); *B32B 2250/24* (2013.01); *B32B 2255/10* (2013.01); *B32B 2255/26* (2013.01); *B32B 2307/4023* (2013.01); *B32B 2307/4026* (2013.01); *B32B 2307/406* (2013.01); *B32B 2307/412* (2013.01); *B32B 2307/538* (2013.01); *B32B 2419/00* (2013.01); *B32B 2451/00* (2013.01); *B32B 2605/003* (2013.01); *B32B 2605/08* (2013.01); *B32B 2605/10* (2013.01); *B32B 2605/12* (2013.01); *B32B 2605/18* (2013.01); *B44F 9/02* (2013.01)

(58) Field of Classification Search
CPC ............ B32B 2250/02; B32B 2250/24; B32B 2255/10; B32B 2255/26; B32B 2307/4023; B32B 2307/4026; B32B 2307/406; B32B 2307/412; B32B 2307/538; B32B 2419/00; B32B 2451/00; B32B 2605/003; B32B 2605/08; B32B 2605/10; B32B 2605/12; B32B 2605/18; B44F 1/02; B44F 9/02; E04F 13/002
See application file for complete search history.

(56) References Cited

U.S. PATENT DOCUMENTS

| | | | | |
|---|---|---|---|---|
| 2019/0085506 | A1* | 3/2019 | Higashikawa | B32B 13/12 |
| 2020/0239729 | A1* | 7/2020 | Sugiyama | C08J 7/046 |
| 2021/0061968 | A1* | 3/2021 | Kondo | C08G 18/10 |
| 2021/0129577 | A1* | 5/2021 | Saito | B32B 25/08 |
| 2022/0185007 | A1* | 6/2022 | Saito | C08J 5/18 |
| 2023/0323144 | A1 | 10/2023 | Kondo et al. | |

FOREIGN PATENT DOCUMENTS

| | | | |
|---|---|---|---|
| JP | 07009650 | B2 | 1/1995 |
| JP | 3997803 | B2 | 10/2007 |
| JP | 2011224962 | A | 11/2011 |
| JP | 2011255552 | A | 12/2011 |
| JP | 2014024318 | A | 2/2014 |
| JP | 5699321 | B2 | 4/2015 |
| JP | 2015199313 | A | 11/2015 |
| JP | 2015208875 | A | 11/2015 |
| JP | 2017154388 | A | 9/2017 |
| JP | 2018071250 | A | 5/2018 |
| JP | 2018079603 | A | 5/2018 |
| JP | 2019123782 | A | 7/2019 |
| JP | 2020049677 | A | 4/2020 |
| WO | 2008129667 | A1 | 10/2008 |
| WO | 2017204362 | A1 | 11/2017 |
| WO | 2019077502 | A2 | 4/2019 |
| WO | 2020212851 | A1 | 10/2020 |

* cited by examiner

FILM AND METHOD OF PRODUCING THE SAME

CROSS REFERENCE TO RELATED APPLICATIONS

This application is a national stage filing under 35 U.S.C. 371 of PCT/IB2021/055816, filed Jun. 29, 2021, which claims the benefit of JP Application No. 2020-117300, filed Jul. 7, 2020, the disclosure of which is incorporated by reference in its/their entirety herein.

TECHNICAL FIELD

The present disclosure relates to a film that can be used in application such as decoration, and a method of producing the same.

BACKGROUND ART

A decorative film has been used for the purposes of decoration of the interior and exterior of a structure, a vehicle, and the like. For example, a decorative film in which a polyvinyl chloride film including a printed layer and a transparent polyvinyl chloride film are laminated and which has been subjected to embossing is known. Various kinds of material texture such as woodgrain, metallic, textile, and marble texture can be expressed by using various combinations of lamination and embossing.

In recent years, there has been a demand for a film that can reproduce a surface of dry-finished wood, matte coating, or the like and has appearance with lower glossiness, and that can be used for the purpose of decoration. A method of forming a decorative film having surface appearance with low glossiness by coating with a resin including microparticles or beads as a surface layer is known. These decorative films can be used for the exterior or interior of structure, the interior of a vehicle, furniture and decoration of an article, and the like.

Patent Document 1 (JP 2011-255552 A) describes an "embossed decorative sheet including a surface embossed, wherein the embossed decorative sheet is provided with a surface-protective layer formed from a curable resin containing synthetic resin beads on a surface side of the decorative sheet, an average depth/height of the embossing is from 15 to 50 μm, and the synthetic resin beads are synthetic resin beads having an average particle size from 8 to 20 μm."

Patent Document 2 (WO 2008/129667) describes a "decorative sheet including a protective layer composed of a transparent resin component as a main component and provided in a surface of a printed layer provided in a printing sheet, wherein the protective layer includes a first protective layer provided on the printed layer of the printing sheet and a second protective layer containing transparent or translucent spherical particles and provided in a prescribed portion on the first protective layer, and luster of a projected surface of the first protective layer is lower than luster of a surface of the second protective layer."

Patent Document 3 (JP 2011-224962 A) describes a "decorative sheet in which at least a transparent resin layer, a luster adjusting layer, and a surface-protecting layer are laminated and an uneven pattern is formed in a surface of the decorative sheet, wherein the uneven pattern partially or entirely includes a recess portion from which the luster adjusting layer is exposed."

Patent Document 4 (JP 2014-024318 A) describes a "decorative sheet including a printed design pattern layer, a matte layer, and a topcoat layer forming a luster difference pattern on a substrate sheet, wherein the substrate sheet contains a vinyl chloride resin, the topcoat layer contains a thermosetting resin and reactive silicone oil."

Patent Document 5 (JP 2015-199313 A) describes a "two faced synchronous gloss mat decorative sheet in which a matte layer is provided in one surface of a transparent thermoplastic resin layer, a gloss negative pattern layer is provided on the matte layer, and a pattern layer is further provided on the other surface of the transparent thermoplastic resin layer."

CITATION LIST

Patent Literature

Patent Document 1: JP 2011-255552 A
Patent Document 2: WO 2008/129667
Patent Document 3: JP 2011-224962 A
Patent Document 4: JP 2014-024318 A
Patent Document 5: JP 2015-199313 A

SUMMARY OF INVENTION

Technical Problem

A surface with low gloss appearance has light diffusing or irregular light reflection properties, and thus it is difficult to express uneven texture in such a low gloss surface. Even when the low gloss surface is subjected to, for example, embossing, glossiness of the entire surface is low, and thus it is difficult to recognize contrast of texture formed by the embossing, and as a result, visibility of the texture is low. This is more pronounced as the glossiness of the low gloss surface is lower.

Additionally, from the perspective of aesthetics, it may be desired that appearance of texture do not change significantly when the low gloss surface is observed at various viewing angles. A low gloss pattern is printed by using matte ink directly on a high gloss surface, for example on a resin film including a smooth surface, and thus low gloss appearance having uneven texture can be provided, but reflection of light may occur in a region where no matte ink is applied or a printing amount of the matte ink is small, and strong glare may occur depending on viewing angles.

Further, it is desirable that texture can be recognized not only visually but also tactilely to achieve an authentic woodgrain design or the like.

The present disclosure provides a film that has high-quality low gloss appearance with a small change in appearance of texture as observed at various viewing angles and that has tactile texture.

Solution to Problem

According to an embodiment, provided is a film including a surface layer embossed, wherein the surface layer includes a low gloss layer and a gloss printed pattern partially covering the low gloss layer, (1) 85-degree surface glossiness of the surface layer is less than or equal to 5.0 GU as an in-plane average value, (2) Δ85-degree surface glossiness defined by a difference between an in-plane maximum value of the 85-degree surface glossiness and the in-plane average value of the 85-degree surface glossiness of the surface layer (=in-plane maximum value of 85-degree surface glossiness—in-plane average value of 85-degree surface glossiness) is from 0.2 to 2.5, and (3) surface roughness Ra of an embossed surface of the film is greater than or equal to 3.5 μm.

According to another embodiment, provided is a film including a surface layer embossed, wherein the surface layer includes a low gloss layer and a gloss printed pattern partially covering the low gloss layer, and the surface layer is formed by forming the gloss printed pattern on the low gloss layer and then embossing the gloss printed pattern.

According to another embodiment, provided is a method of producing a film, the method including forming a low gloss layer on a substrate, forming a gloss printed pattern on the low gloss layer, the gloss printed pattern partially covering the low gloss layer, and embossing the gloss printed pattern.

Advantageous Effects of Invention

A film of the present disclosure has high-quality low gloss appearance with a small change in appearance of texture even as observed at various viewing angles, and has tactile texture. Therefore, a design, for example, an authentic woodgrain design can be imparted to the interior and exterior of a structure, a vehicle, and the like.

Note that the above description is not construed as a disclosure of all of embodiments and advantages of the present invention.

DESCRIPTION OF EMBODIMENTS

Figure 1:
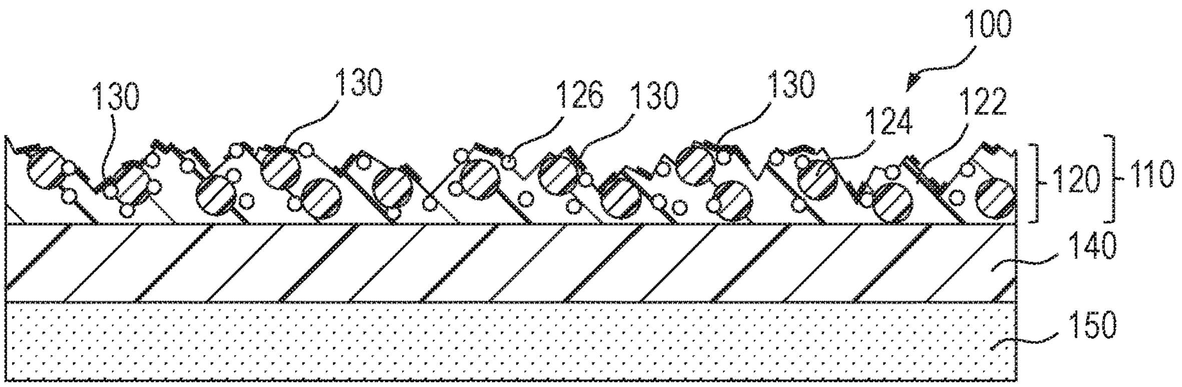
FIG. 1 is a schematic cross-sectional view of a film of an embodiment.

Hereinafter, representative embodiments of the present invention will be described in more detail for the purpose of exemplification, but the present invention is not limited to these embodiments.

In the present disclosure, "transparent" refers to a condition where total light transmittance in the wavelength range from 400 to 700 nm of a material or an article is approximately greater than or equal to 85%. "Translucent" refers to a condition where total light transmittance in the wavelength range of 400 to 700 nm of a material or an article is approximately greater than or equal to 20% and less than approximately 85%. "Opaque" refers to a condition where total light transmittance in the wavelength range from 400 to 700 nm of a material or an article is less than approximately 20%. The total light transmittance is determined in accordance with JIS K 7361-1:1997 (ISO 13468-1:1996).

A film includes a surface layer embossed. The surface layer embossed imparts tactile texture to the film. The surface layer includes a low gloss layer and a gloss printed pattern partially covering the low gloss layer. A region of the low gloss layer not covered with the gloss printed pattern exhibits matte appearance, and surface glossiness of a region of the gloss printed pattern is higher than surface glossiness of the region not covered with the gloss printed pattern. The gloss printed pattern partially covering the low gloss layer is used, and thus a change in glossiness caused by cooperation between a region of the low gloss layer not covered with the gloss printed pattern and the gloss printed pattern is visually recognized by an observer as texture (unevenness). In this way, texture that can be recognized visually even in a low gloss surface can be formed in the film.

In an embodiment, the film has the following properties.

(1) 85-degree surface glossiness of the surface layer is approximately less than or equal to 5.0 GU as an in-plane average value.

(2) Δ85-degree surface glossiness defined by a difference between an in-plane maximum value of the 85-degree surface glossiness and the in-plane average value of the 85-degree surface glossiness of the surface layer (=in-plane maximum value of 85-degree surface glossiness—in-plane average value of 85-degree surface glossiness) is from approximately 0.2 to approximately 2.5.

(3) Surface roughness Ra of an embossed surface of the film is approximately greater than or equal to 3.5 μm.

In another embodiment, the surface layer is formed by forming the gloss printed pattern on the low gloss layer and then embossing the gloss printed pattern.

The low gloss layer can be formed, for example, by applying a matte coating composition including a low gloss agent onto a substrate layer and heating as necessary or by kneading the low gloss agent and a resin to form into a film.

In an embodiment, the low gloss layer includes a binder including a resin, resin beads having an average particle size of approximately greater than or equal to 4 μm and approximately less than or equal to 20 μm, and nano-silica particles. The low gloss layer includes the resin beads having the average particle size in the above-described range and the nano-silica particles, and thus low gloss appearance can be imparted to the film, and the low gloss appearance can also be maintained after the film is stretched. The film of this embodiment is a film that can be stretched to conform to a shape of an article to which the film is attached. Additionally, even when unevenness due to embossing or the like is imparted to the low gloss layer, low gloss appearance can be maintained. The film of this embodiment can impart unevenness having a pattern such as woodgrain, sand, cloth texture, and leather (such as a cow and a pig). Even when the gloss printed pattern is further imparted on the low gloss layer, low gloss appearance can be maintained. The film of this embodiment can form a printed pattern having a pattern such as woodgrain, sand, cloth texture, leather (such as a cow and a pig), stone, concrete, and rust (a pattern like an oxidized film formed in a metal surface).

A schematic cross-sectional view of a film of an embodiment is illustrated in FIG. 1. A film 100 of FIG. 1 includes a surface layer 110, and a substrate layer 140 and an adhesive layer 150 which are optional components. The film 100 may be a film formed of only the surface layer 110, that is, the surface layer 110 itself may be a film. The surface layer 110 is embossed and includes a low gloss layer 120, and a gloss printed pattern 130 partially covering the low gloss layer 120. The low gloss layer 120 includes a binder 122 including a resin, resin beads 124 having an average particle size of approximately greater than or equal to 4 μm and approximately less than or equal to 20 μm, and nano-silica particles 126.

Various resins can be used as the resin in the binder. In an embodiment, the binder includes a urethane resin. Various known urethane resins can be used as the urethane resin. The urethane resin can be obtained by drying or curing a urethane resin composition. The urethane resin composition may be of an aqueous system or may be of a non-aqueous system. It is advantageous that the urethane resin is a cured product of a two-part urethane resin composition. The two-part urethane resin composition is typically a non-aqueous urethane resin composition. The two-part urethane resin composition is used, and thus a chemical bond between the urethane resin and other components of the low gloss layer, for example, the resin beads, particularly urethane resin beads, and the nano-silica particles is formed during formation of the low gloss layer, and shedding of these particles from the low gloss layer and bleeding out of the components can be prevented or suppressed.

The two-part urethane resin composition typically includes a polyol as a primary agent and a multi-functional isocyanate as a curing agent and, includes, as necessary, a catalyst and/or a solvent.

As the polyol, a polyester polyol such as polycaprolactone diol and polycaprolactone triol; a polycarbonate polyol such as cyclohexanedimethanol carbonate and 1,6-hexanediol carbonate; and combinations thereof can be used. These polyols can impart transparency, weather resistance, strength, chemical resistance, and the like to the low gloss layer. In particular, the polycarbonate polyol can form the low gloss layer having high transparency and chemical resistance. From the perspective of imparting stretchability to the low gloss layer without formation of excessive degree of crosslinked structure, the polyol is preferably a diol, and a polyester diol and a polycarbonate diol, in particular, a polycarbonate diol can be used advantageously.

An OH value of the polyol can typically be approximately greater than or equal to 10 mg/KOH, approximately greater than or equal to 20 mg/KOH, or approximately greater than or equal to 30 mg/KOH, and approximately less than or equal to 150 mg/KOH, approximately less than or equal to 130 mg/KOH, or approximately less than or equal to 120 mg/KOH.

Examples of the multi-functional isocyanate include an aliphatic polyisocyanate, an alicyclic polyisocyanate, an aromatic polyisocyanate, and an aromatic aliphatic polyisocyanate, and a multimer (a dimer, a trimer, and the like), a biuret-modified product, an allophanate-modified product, a polyol-modified product, an oxadiazine trione-modified product, and a carbodiimide-modified product of these polyisocyanates. From the perspective of imparting stretchability to the low gloss layer without formation of excessive degree of crosslinked structure, the multi-functional isocyanate is preferably diisocyanate. Examples of such diisocyanate include an aliphatic diisocyanate such as tetramethylene diisocyanate and hexamethylene diisocyanate (HDI); an alicyclic diisocyanate such as isophorone diisocyanate, trans, trans- and trans, cis- and cis, cis-dicyclohexylmethane-4,4'-diisocyanate and mixtures thereof (hydrogenated MDI); an aromatic diisocyanate such as 2,4-tolylene diisocyanate and 2,6-tolylene diisocyanate, and isomeric mixtures of these tolylene diisocyanates (TDI), 4,4'-diphenylmethane diisocyanate, 2,4'-diphenylmethane diisocyanate, and 2,2'-diphenylmethane diisocyanate, and isomeric mixtures of these diphenylmethane diisocyanates (MDI); an aromatic-aliphatic diisocyanate such as 1,3- or 1,4-xylylene diisocyanate or mixtures thereof (XDI), and 1,3- or 1,4-tetramethylxylylene diisocyanate or mixtures thereof (TMXDI).

As an equivalent weight ratio of the polyol to the polyisocyanate, typically, the equivalent weight of the polyisocyanate can be approximately greater than or equal to 0.6 equivalents, approximately greater than or equal to 0.7 equivalents, and approximately less than or equal to 2 equivalents, or approximately less than or equal to 1.2 equivalents, with respect to 1 equivalent of the polyol.

As the catalyst, a catalyst that is typically used in formation of a urethane resin such as di-n-butyltin dilaurate, zinc naphthenate, zinc octenoate, and triethylenediamine can be used. A used amount of the catalyst can typically be approximately greater than or equal to 0.005 parts by mass, or approximately greater than or equal to 0.01 parts by mass, and approximately less than or equal to 0.5 parts by mass, or approximately less than or equal to 0.2 parts by mass, based on 100 parts by mass of the two-part urethane resin composition.

The binder may further include cellulose ester. The binder contains the cellulose ester, and thus, since viscosity of the binder during a drying process can be increased and surface fluidity can be decreased, a binder precursor including the resin beads can be applied uniformly. Examples of the cellulose ester include cellulose acetate propionate and cellulose acetate butyrate.

The number average molecular weight of the cellulose ester can typically be approximately greater than or equal to 12000, approximately greater than or equal to 16000, or approximately greater than or equal to 20000, and approximately less than or equal to 110000, approximately less than or equal to 100000, or approximately less than or equal to 90000, taking solubility in the solvent into consideration. The number average molecular weight of the cellulose esters is determined by gel permeation chromatography (GPC) calibrated with a polystyrene standard.

A glass transition temperature (Tg) of the cellulose ester can typically be approximately greater than or equal to 85° C., approximately greater than or equal to 96° C., or approximately greater than or equal to 101° C., and approximately less than or equal to 190° C., approximately less than or equal to 180° C., or approximately less than or equal to 160° C., taking capability of maintaining a shape at used temperature into consideration. The glass transition temperature of the cellulose ester is determined by using differential scanning calorimetry (DSC).

In some embodiments, the binder may include the cellulose ester by an amount of approximately greater than or equal to 5 parts by mass, approximately greater than or equal to 10 parts by mass, or approximately greater than or equal to 15 parts by mass, and approximately less than or equal to 35 parts by mass, approximately less than or equal to 30 parts by mass, or approximately less than or equal to 25 parts by mass, based on 100 parts by mass of the binder. When the compounded amount of the cellulose ester is in the above-described range, the resin beads are uniformly dispersed by the low gloss layer and uniform low gloss appearance can be imparted to the film.

Various resin beads can be used as the resin beads. The resin beads form a fine ruggedness due to the presence of the beads in a surface of the low gloss layer and a low gloss construction can be formed in the surface of the low gloss layer.

In an embodiment, the resin beads are urethane resin beads. The urethane resin beads have good affinity to the binder including the resin, especially the binder including the urethane resin, and the urethane resin beads have high adhesive properties to the binder. As a result, shedding of the urethane resin beads from the binder can be suppressed in a case where the film is stretched or deformed. As the urethane resin beads, crosslinked polyurethane microparticles obtained by suspension polymerization, seed polymerization, emulsion polymerization, or the like can be used. The urethane resin beads have excellent pliability, toughness, scratch resistance, and the like, and can impart these characteristics to the low gloss layer.

The average particle size of the resin beads is approximately greater than or equal to 4 μm and approximately less than or equal to 20 μm. The average particle size of the resin beads may be approximately greater than or equal to 6 μm, or approximately greater than or equal to 10 μm, and approximately less than or equal to 10 μm, or approximately less than or equal to 15 μm. In a case where the average particle size of the resin beads is less than approximately 4 μm, whitening due to scattering of light easily occurs in a surface of the film. When the average particle size of the resin beads exceeds approximately 20 μm, glossiness easily occurs, and it becomes difficult to obtain low glossiness. The resin beads having the average particle size in the above-described range can impart low lightness, that is, low glossiness with less whiteness, to the low gloss layer by appropriately scattering incident light to the low gloss layer. The average particle size of the resin beads is a particle size having cumulative volume of 50% measured by using a laser diffraction particle size distribution measuring device.

In some embodiments, the low gloss layer may include the resin beads by an amount of approximately greater than or equal to 70 parts by mass, approximately greater than or equal to 80 parts by mass, or approximately greater than or equal to 100 parts by mass, and approximately less than or equal to 240 parts by mass, approximately less than or equal to 230 parts by mass, or approximately less than or equal to 200 parts by mass, based on 100 parts by mass of the binder. When the compounded amount of the resin beads is less than approximately 70 parts by mass, it becomes difficult to obtain low glossiness, and when the compounded amount of the resin beads exceeds approximately 240 parts by mass, whitening easily occurs. When the compounded amount of the resin beads is in the above-described range, the low gloss layer that exhibits low glossiness in a wide range of viewing angles, for example, from 20 degrees to 85 degrees can be obtained.

The presence of the nano-silica particles in the binder can further decrease glossiness of the low gloss layer. Additionally, a change in low glossiness that easily occurs in a case where only the resin beads are used and the film is stretched can be suppressed, and whitening of the film can be prevented effectively.

As the nano-silica particles, for example, a silica sol obtained by using liquid glass (sodium silicate solution) as a starting material can be used. Surfaces of the nano-silica particles may be modified by using a surface treatment agent such as silane, alcohol, amine, carboxylic acid, sulfonic acid, phosphonic acid, and titanate.

In some embodiments, the average particle size of the nano-silica particles is approximately greater than or equal to 10 nm, approximately greater than or equal to 20 nm, or approximately greater than or equal to 30 nm, and approximately less than or equal to 100 nm, approximately less than or equal to 75 nm, or approximately less than or equal to 45 nm. In this way, the nano-silica particles having an extremely small size is used, and thus the nano-silica particles can be dispersed highly in the low gloss layer. Even in a case where the film is stretched, since the extremely small nano-silica particles are dispersed and remain in a stretched part, loss of low glossiness can be suppressed and whitening of the film can be prevented effectively. The nano-silica particles that are present adjacent to the resin beads may function as a sort of physical crosslinking points between the resin beads, especially urethane resin beads, and the binder. Due to the presence of the nano-silica particles which can function as such a physical crosslinking point, shedding of the resin beads in the case of stretching the film can be suppressed, and whitening of the film can be prevented effectively. The average particle size of the nano-silica particles is a value calculated from specific surface area measured by using a BET method.

In some embodiments, the low gloss layer may include the nano-silica particles by an amount of approximately greater than or equal to 5 parts by mass, approximately greater than or equal to 10 parts by mass, or approximately greater than or equal to 20 parts by mass, and approximately less than or equal to 120 parts by mass, approximately less than or equal to 110 parts by mass, or approximately less than or equal to 100 parts by mass, based on 100 parts by mass of the binder. The compounded amount of the nano-silica particles is in the above-described range, and thus glossiness of the low gloss layer can further be decreased. The compounded amount of the nano-silica particles is in the above-described range, and thus low gloss appearance can be maintained even at the time of stretching the film, and for example, at the time of 150% stretching, an increase in lightness, that is, whitening, can also be prevented or suppressed. The compounded amount of the nano-silica particles is in the above-described range, and thus excellent scratch resistance can be imparted to the low gloss layer.

The low gloss layer may further include a silicone-modified polymer having a functional group capable of reacting with an isocyanate or a hydroxy group. When finger sebum is attached to a surface with low gloss, trace of the finger sebum is easily observed. The low gloss layer includes the silicone-modified polymer having a functional group capable of reacting with an isocyanate or a hydroxy group, and thus fingerprint resistance of the low gloss layer can be enhanced. The silicone-modified polymer decreases a friction coefficient of the low gloss layer, and can also impart scratch resistance due to smoothness to the low gloss layer. The isocyanate or the hydroxy group of the silicone-modified polymer reacts with a hydroxy group or an isocyanate group in the urethane resin or the urethane resin beads in the binder, and the silicone-modified polymer may be bonded to the urethane resin or the urethane resin beads. In this embodiment, bleeding out of the silicone-modified polymer from the low gloss layer can be prevented or suppressed.

As the silicone-modified polymer having a functional group capable of reacting with an isocyanate or a hydroxy group, a silicone-modified polymer such as a polyether-modified silicone, a polyester-modified silicone, an aralkyl-modified silicone, an acryl-modified silicone, and a silicone-modified polyacrylate and a urethane-modified silicone can be used. Examples of the functional group capable of reacting with an isocyanate or a hydroxy group of the silicone-modified polymer include a hydroxy group, an amino group having active hydrogen, an isocyanate group, an epoxy group, and an acid anhydride group. From the perspective of achieving particularly excellent fingerprint resistance, the silicone-modified polymer is advantageously a silicone-modified polyacrylate. The silicone-modified polymer desirably has a hydroxy group or an isocyanate group having high reactivity with an isocyanate or a hydroxy group, and particularly has a hydroxy group.

In some embodiments, the low gloss layer may include the silicone-modified polymer having a functional group capable of reacting with an isocyanate or a hydroxy group, for example, a silicone-modified polyacrylate by an amount of approximately greater than or equal to 0.1 parts by mass, approximately greater than or equal to 0.5 parts by mass, or approximately greater than or equal to 1.0 part by mass, and approximately less than or equal to 15 parts by mass, approximately less than or equal to 12 parts by mass, or approximately less than or equal to 10 parts by mass, based on 100 parts by mass of the binder. When the compounded amount of the silicone-modified polymer is in the above-described range, fingerprint resistance and/or scratch resistance of the low gloss layer can further be enhanced.

As other optional components, the low gloss layer may include an additive such as a filler other than the resin beads and the nano-silica particles, a UV absorber, a photostabilizer, a thermal stabilizer, a dispersant, a plasticizer, a flow enhancing agent, a leveling agent, and a flame retardant. A compounded amount of each of these additives and a total compounded amount of these additives can be determined in the range where the characteristics required of the low gloss layer are not impaired.

In an embodiment, the low gloss layer includes a flake-shaped filler having an average particle size of greater than approximately 30 μm and less than approximately 1000 μm in the range where low gloss appearance is not impaired. Examples of the flake-shaped filler include expandable graphite, an aluminum foil powder pigment, a glass flake powder pigment, and a resin film foil powder pigment. The average particle size of the flake-shaped filler is a particle size having cumulative volume of 50% measured by using a laser diffraction particle size distribution measuring device. The thickness of the flake-shaped filler may be from approximately 0.5 μm to approximately 30 μm. The aspect ratio of the flake-shaped filler may be from approximately 1.0 to approximately 2000.

The low gloss layer including the binder, the resin beads and the nano-silica particles as described above can be formed by using a coating composition including a binder precursor including a resin composition, resin beads having an average particle size of approximately greater than or equal to 4 μm and approximately less than or equal to 20 μm, and nano-silica particles. In an embodiment, the resin composition is a urethane resin composition. In an embodiment, the resin beads are urethane resin beads.

The binder precursor may include, in addition to the resin composition, the cellulose ester described above for the binder. The cellulose ester can impart quick-drying properties, dry feeling as touched by a finger, flowability, leveling properties, or the like to the coating composition. The cellulose ester can also be used for the purpose of adjusting viscosity of the coating composition.

The coating composition may further include the above-described silicone-modified polymer having a functional group capable of reacting with an isocyanate or a hydroxy group. The isocyanate or the hydroxy group of the silicone-modified polymer reacts with the hydroxy group or the isocyanate group of the urethane resin composition or the urethane resin beads, and the silicone-modified polymer can be bonded to the urethane resin or the urethane resin beads. Accordingly, bleeding out of the silicone-modified polymer from the low gloss layer can be prevented or suppressed. When the silicone-modified polymer is used, from the perspective of reactivity, it is advantageous that the urethane resin composition is a two-part urethane resin composition.

The composition of the coating composition is as described for the above-described low gloss layer including the binder, the resin beads and the nano-silica particles. The same applies to compounded amounts of the cellulose ester, the resin beads, the nano-silica particles, and the silicone-modified polymer having a functional group capable of reacting with an isocyanate or a hydroxy group, based on 100 parts by mass of the binder precursor, instead of 100 parts by mass of the binder.

To enhance workability, coatability, and the like, the coating composition may further include a solvent such as a ketone such as methyl ethyl ketone, methyl isobutyl ketone, and acetyl acetone; an aromatic hydrocarbon such as toluene, and xylene; alcohol such as ethanol and isopropyl alcohol; ester such as ethyl acetate and butyl acetate; and ether such as tetrahydrofuran, propylene glycol monomethyl ether, propylene glycol monomethyl ether acetate (1-methoxy-2-propyl acetate), and dipropylene glycol monomethyl ether acetate. A compounded amount of the solvent in the coating composition is typically approximately greater than or equal to 20 parts by mass, or approximately greater than or equal to 30 parts by mass, and approximately less than or equal to 60 parts by mass, or approximately less than or equal to 50 parts by mass, based on 100 parts by mass of the binder precursor.

Viscosity of the coating composition is typically approximately greater than or equal to 20 mPa's, approximately greater than or equal to 50 mPa·s, or approximately greater than or equal to 100 mPa·s, and approximately less than or equal to 1000 mPa·s, approximately less than or equal to 800 mPa's, or approximately less than or equal to 600 mPa·s. The viscosity of the coating composition is measured by using a B-type viscometer at a revolution speed of 60 rpm by selecting an appropriate spindle.

The low gloss layer can be formed by coating a substrate with the coating composition by using knife coating, bar coating, blade coating, doctor coating, roll coating, cast coating, and the like and, as necessary, heating at approximately 80° C. to approximately 150° C., and drying and/or curing.

The thickness of the low gloss layer can be, for example, approximately greater than or equal to 3 μm, approximately greater than or equal to 5 μm, or approximately greater than or equal to 10 μm, and approximately less than or equal to 50 μm, approximately less than or equal to 30 μm, or approximately less than or equal to 20 μm. In the present disclosure, the thickness of the low gloss layer refers to the thickness of the thickest portion, that is, the maximum thickness.

In some embodiments, the low gloss layer is transparent or translucent. In these embodiments, total light transmittance in the wavelength range of 400 to 700 nm of the low gloss layer may be approximately greater than or equal to 80%, approximately greater than or equal to 85%, or approximately greater than or equal to 90%. In these embodiments, decoration such as printing imparted to the substrate can be recognized visually through the low gloss layer.

The gloss printed pattern is used to partially provide a region having relatively higher gloss than that of the low gloss layer on the low gloss layer to impart visible texture due to a difference in glossiness of the low gloss layer, to the film. The gloss printed pattern can be formed on the low gloss layer by using known gloss ink and a printing technique. From the perspective of suppressing glare due to a change in a viewing angle, it is desirable that the gloss printed pattern be formed by a thickness to an extent that unevenness formed by the embossing is not completely covered.

In an embodiment, the gloss printed pattern is a printed pattern by a printing plate. Examples of the printing by a printing plate include gravure printing, offset printing, letterpress printing, and screen printing. From the perspective of reducing the grain size of gloss ink used for printing and of controlling the thickness of the gloss printed pattern, gravure printing and letterpress printing are preferable, and gravure printing is more preferable.

In the case of gravure printing, it is desirable that the number of lines in the gravure plate be greater than or equal to 60 lines, greater than or equal to 80 lines, or greater than or equal to 100 lines and less than or equal to 350 lines, less than or equal to 200 lines, or less than or equal to 175 lines, from the perspective of reducing the grain size of gloss ink used for printing and of controlling the thickness of the gloss printed pattern. The number of lines in the gravure plate correlates to the printing amount of gloss ink. The number of lines in the gravure plate is set to be greater than or equal to 100 lines, and thus the definition of printing and the printing amount of ink can be achieved in a highly-balanced manner. On the other hand, the number of lines in the gravure plate is set to be less than or equal to 175 lines, and thus high definition printing in which high-solid-content ink is also assumed can be applied.

Solvent-based, water-based, or UV curable ink can be used as the gloss ink, and a solvent-based ink is desirable from the perspective of controlling the amount of the gloss ink used for printing and of workability. The gloss ink may be transparent, translucent, or opaque, and may be colorless or colored.

In an embodiment, the gloss printed pattern includes gloss ink selected from the group consisting of acrylic ink, urethane ink, and vinyl chloride-vinyl acetate ink. Acrylic ink, urethane ink, and vinyl chloride-vinyl acetate ink are advantageously used from the perspective of versatility. In particular, acrylic ink and urethane ink are favorable also from the perspective of durability.

The gloss ink may or may not include an additive such as a filler (for example, inorganic beads, resin beads, and the like), an anti-smudge agent, and a weather resistant stabilizer for the purposes of low gross and the like, provided that the gloss ink can form a printing pattern having higher gloss than the low gloss layer.

The thickness of the gloss printed pattern is desirably small to an extent that the presence of the gloss print pattern can be recognized from various viewing angles but surface glossiness is not excessively increased, and when a solvent-based ink is used, the thickness of the gloss printed pattern may typically be approximately greater than or equal to 0.1 μm, approximately greater than or equal to 0.2 μm, or approximately greater than or equal to 0.3 μm, and approximately less than or equal to 5 μm, approximately less than or equal to 3 μm, or approximately less than or equal to 2 μm.

The gloss printed pattern may be continuous or may be discontinuous. The gloss printed pattern may be disposed to correspond to the entire surface of the film or may be disposed to correspond to a portion or a plurality of portions of the surface. Examples of the printed pattern include woodgrain, stone, a logo, a picture, text, and a symbol.

The surface layer is embossed, and thus the film includes an embossed surface. Due to the embossing, tactile texture can be imparted to the embossed surface of the film. The embossing can be performed under known conditions by using embossing rolls including various patterns. The embossing can be performed deeper than the thickness of the surface layer, and, for example, another layer such as the substrate layer located below the surface layer may be embossed together with the surface layer.

A maximum height Rz of the embossing can typically be approximately greater than or equal to 30 μm, approximately greater than or equal to 40 μm, or approximately greater than or equal to 50 μm. The maximum height Rz of the embossing is set to be approximately greater than or equal to 40 μm, and thus favorable tactility can be imparted, and the maximum height Rz is further set to be approximately greater than or equal to 50 μm, and thus clear tactility can be imparted. The maximum height Rz of the embossing can typically be approximately less than or equal to 200 μm, approximately less than or equal to 150 μm, or approximately less than or equal to 100 μm. The maximum height Rz of the embossing is set to be approximately less than or equal to 100 μm, and thus favorable cleanability can be imparted to the embossed surface of the film.

In an embodiment, the embossing can be performed after formation of the low gloss layer and the gloss printed pattern. In this embodiment, both the low gloss layer and the gloss printed pattern are embossed. Accordingly, the gloss printed pattern conforms to an uneven shape formed by the embossing, and glare due to a change in a viewing angle can be suppressed effectively.

In an embodiment, at least a portion of the gloss printed pattern is distributed in a bottom portion of the surface layer embossed. Accordingly, glare due to a change in a viewing angle can be suppressed effectively.

The gloss printed pattern and a pattern of the embossing may be synchronized or may not be synchronized partially or entirely. In an embodiment, the film includes a portion where the gloss printed pattern and the pattern of the embossing are not synchronized. In this embodiment, tactile texture due to the embossing and visible texture due to the gloss printed pattern can be formed independently and separately, and thus a highly complex design can be expressed. For example, while tactile texture of a cross section of a tree is formed by the embossing, visible texture of a woodgrain pattern can be formed by the gloss printed pattern.

In an embodiment, the surface layer has the following properties (1) and (2).

(1) 85-degree surface glossiness is approximately less than or equal to 5.0 GU as an in-plane average value.

(2) Δ85-degree surface glossiness defined by a difference between an in-plane maximum value of the 85-degree surface glossiness and the in-plane average value of the 85-degree surface glossiness (=in-plane maximum value of 85-degree surface glossiness—in-plane average value of 85-degree surface glossiness) is from approximately 0.2 to approximately 2.5.

The 85-degree surface glossiness is approximately less than or equal to 5.0 GU as the in-plane average value and the Δ85-degree surface glossiness is approximately less than or equal to 2.5, and thus glare due to a change in a viewing angle can be suppressed. The Δ85-degree surface glossiness is approximately greater than or equal to 0.2, and thus visibility of the gloss printed pattern is ensured and a design having fineness and a stereoscopic effect can be expressed.

The in-plane average value of the 85-degree surface glossiness is preferably approximately less than or equal to 4.5 GU, more preferably approximately less than or equal to 3.5 GU, and even more preferably approximately less than or equal to 2.7 GU. When the in-plane average value is approximately less than or equal to 4.5 GU, favorable low gloss appearance can be obtained, and designability can be enhanced, and when the in-plane average value is approximately less than or equal to 3.5 GU, designability can further be enhanced. The in-plane average value of the 85-degree surface glossiness can typically be approximately greater than or equal to 0.1 GU, approximately greater than or equal to 0.2 GU, or approximately greater than or equal to 0.5 GU.

The Δ85-degree surface glossiness is preferably approximately from 0.22 to approximately 2.3, more preferably from approximately 0.25 to approximately 2.0, and even more preferably from approximately 0.3 to approximately 1.5. The Δ85-degree surface glossiness is set to be from approximately 0.22 to approximately 2.3, and thus a favorable design due to moderate low gloss appearance and gloss printing can be expressed. The Δ85-degree surface glossiness is set to be from approximately 0.25 to approximately 2.0, and thus designability can further be enhanced due to favorable low gloss appearance and gloss printing.

The 85-degree surface glossiness is measured by using a portable glossmeter BYK-Gardner micro-TRI-gloss (BYK Japan KK, Shinjuku-ku, Tokyo, Japan) in accordance with the following procedure.

The in-plane average value of the 85-degree surface glossiness is an average value of measurements at 5 points in total: one point in the center of a sample from 200 mm to 400 mm in length and from 200 mm to 400 mm in width, and the center of each of four regions obtained by dividing the sample into four regions (divided vertically into two regions and horizontally into two regions) through the center of the sample. At each measurement point, the 85-degree surface glossiness is measured in accordance with the following procedure.

(1) A reference line in an arbitrary direction that passes through the measurement point is set.

(2) The 85-degree surface glossiness is measured in six directions at angles of 0 degree, 30 degrees, 60 degrees, 90 degrees, 120 degrees, and 150 degrees from the set reference line.

(3) A maximum value of measured values in the six directions is adopted as a value at the measurement point.

As for the in-plane maximum value of the 85-degree surface glossiness, a sample from 200 mm to 400 mm in length and from 200 mm to 400 mm in width is divided into four regions (divided vertically into two regions and horizontally into two regions) through the center of the sample. In each region, a location having the highest glossiness is visually determined as a first measurement point at which the 85-degree surface glossiness is measured in accordance with the following procedure.

(1) A first reference line in an arbitrary direction that passes through the first measurement point is set.

(2) The 85-degree surface glossiness is measured in six directions at angles of 0 degree, 30 degrees, 60 degrees, 90 degrees, 120 degrees, and 150 degrees from the set first reference line.

(3) A maximum value of measured values in the six directions is adopted as a value at the first measurement point.

(4) A second reference line is set in the direction of the angle at which the maximum value is measured to pass through the first measurement point, and a third reference line is set in the direction orthogonal to the second reference line to pass through the first measurement point.

(5) A total of four points, two points 20 mm apart from the first measurement point on the second reference line and two points 5 mm apart from the first measurement point on the third reference line, are determined as second measurement points at which the 85-degree surface glossiness is measured in the direction parallel to the second reference line.

(6) A maximum value of values measured at the first measurement point and the second measurement points (5 points/region×4 regions=maximum value of 20 points) is adopted as the in-plane maximum value.

In an embodiment, the surface roughness Ra of the embossed surface of the film is approximately greater than or equal to 3.5 μm. The surface roughness Ra of the embossed surface of the film is approximately greater than or equal to 3.5 μm, and thus favorable tactility can be imparted to the film. Depending on application and a design, the surface roughness Ra of the embossed surface of the film can be approximately greater than or equal to 5.0 μm or approximately greater than or equal to 10 μm. The surface roughness Ra of the embossed surface of the film can typically be approximately less than or equal to 50 μm or approximately less than or equal to 30 μm.

The maximum height Rz of the embossed surface of the film can typically be approximately greater than or equal to 30 μm, approximately greater than or equal to 40 μm, or approximately greater than or equal to 50 μm. The maximum height Rz of the embossed surface of the film is set to be approximately greater than or equal to 40 μm, and thus favorable tactility can be imparted, and the maximum height Rz is further set to be approximately greater than or equal to 50 μm, and thus clear tactility can be imparted. The maximum height Rz of the embossed surface of the film can typically be approximately less than or equal to 200 μm, approximately less than or equal to 150 μm, or approximately less than or equal to 100 μm. The maximum height Rz of the embossed surface of the film is set to be approximately less than or equal to 100 μm, and thus favorable cleanability can be imparted to the film.

The surface roughness Ra and the maximum height Rz are arithmetic average roughness and the maximum height, respectively, measured in accordance with line roughness of JIS B 0601:2001.

In an embodiment, the in-plane average value of the surface glossiness of the surface layer is approximately less than or equal to 5.0 GU, approximately less than or equal to 3.5 GU, approximately less than or equal to 2.7 GU, or approximately less than or equal to 1.0 GU when a measurement angle is set to be 60 degrees.

In an embodiment, the in-plane average value of the surface glossiness of the surface layer is approximately less than or equal to 1.4 GU at 20 degrees, approximately less than or equal to 5.0 GU at 60 degrees, and approximately less than or equal to 5.0 GU at 85 degrees. In some embodiments, the in-plane average value of the surface glossiness of the surface layer is approximately less than or equal to 1.4 GU at 20 degrees, approximately less than or equal to 3.5 GU at 60 degrees, approximately less than or equal to 3.5 GU at 85 degrees, or approximately less than or equal to 1.3 GU at 20 degrees, approximately less than or equal to 2.7 GU at 60 degrees, and approximately less than or equal to 2.7 GU at 85 degrees. The in-plane average value of the surface glossiness of the surface layer is a combination of the above-described ranges, and thus reflection of light incident on the film at various angles is suppressed, and decoration of the film or a decorative surface covered with the film (when the film is used as an over-laminate film) can be recognized from a wide range of viewing angles.

The in-plane average values of the surface glossiness at a measurement angle of 20 degrees and a measurement angle of 60 degrees are each determined in the same procedure as the method described above for the in-plane average value of the 85-degree surface glossiness, except that the measurement angle is set to be 20 degrees or 60 degrees.

The film may further include a substrate layer as a substrate. The substrate layer may be stretchable. As the substrate layer, at least one resin layer selected from the group consisting of polyvinyl chloride, polyurethane, polyethylene, polypropylene, a vinyl chloride-vinyl acetate resin, an acrylic resin, a cellulose resin, an ionomer resin, a silicone resin, and a fluororesin can be used.

The substrate layer may be colored or colorless. The substrate layer may be opaque, translucent or transparent. The substrate layer may include a substantially smooth surface and may include a structured surface that can be formed by surface processing such as embossing. Appearance or a shape of the substrate layer is as described above and various decorative characteristics can be imparted to the film.

The substrate layer may include a printed layer on either one or both of surfaces. The printed layer imparts designability to the film. The printed layer can be formed by using a printing technique such as inkjet printing, gravure printing, electrostatic printing, screen printing, and offset printing.

As printing ink, solvent-based ink, water-based ink, or UV curable ink can be used. The printing ink may be transparent, translucent, or opaque, and may be colorless or colored.

The thicknesses of the printed layer may vary, and when solvent-based ink is used, the thickness can typically be approximately greater than or equal to 0.1 μm, approximately greater than or equal to 0.2 μm, or approximately greater than or equal to 0.3 μm and approximately less than or equal to 10 μm or approximately less than or equal to 5 μm. When UV curable ink is used, the thickness can be approximately greater than or equal to 1 μm or approximately greater than or equal to 5 μm, and approximately less than or equal to 50 μm or approximately less than or equal to 30 μm. In the present disclosure, the thickness of the printed layer refers to the thickness of the thickest portion, that is, the maximum thickness.

The printed layer may be continuous or discontinuous. The printed layer may be disposed to correspond to the entire surface of the substrate layer, or may be disposed to correspond to a portion or a plurality of portions of the surface. The printed layer may cover the entire surface of the substrate layer. In an embodiment, the printed layer includes a printed region and an unprinted region. Examples of a design of the printed layer include woodgrain, stone, a logo, a picture, text, and a symbol.

The design of the printed layer may or may not be synchronized with the gloss printed pattern. In a case where the design of the printed layer is synchronized with the gloss printed pattern, a design closer to an actual object is easily reproduced, and thus this case is preferable.

In an embodiment, the printed layer can be printed by a printing plate. Examples of the printing by a printing plate include gravure printing, offset printing, letterpress printing, and screen printing. When printing is performed with the design of the printed layer and the gloss printed pattern synchronized, gravure printing and letterpress printing are preferable, and gravure printing is more preferable, from the perspective of controlling the printing plate.

When gravure printing is performed with the design of the printed layer and the gloss printed pattern synchronized, it is desirable that the number of lines in a gravure plate be greater than or equal to 60 lines, greater than or equal to 80 lines, or greater than or equal to 100 lines and less than or equal to 350 lines, less than or equal to 200 lines, or less than or equal to 175 lines, from the perspective of the grain size of the gloss ink of the gloss printed pattern.

Figure 2:
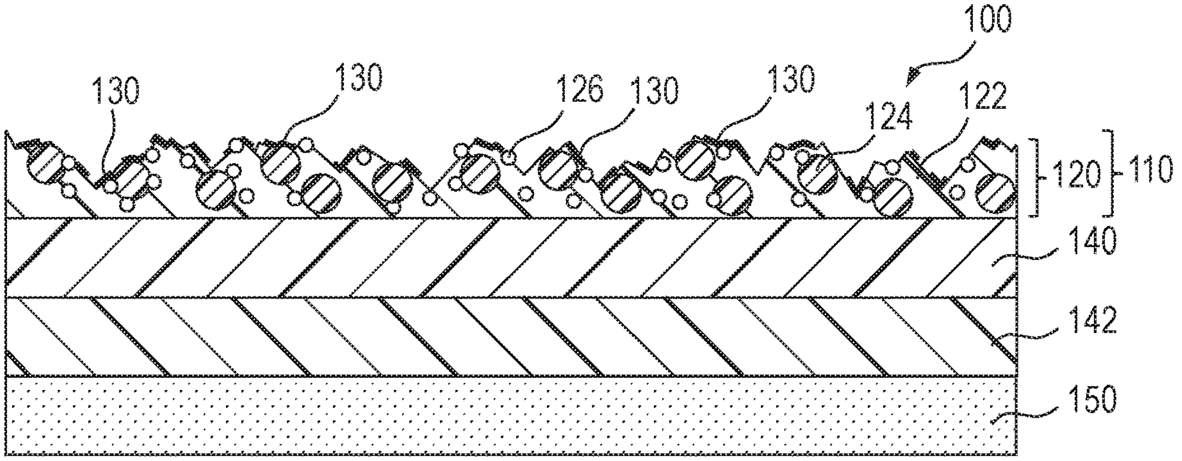
FIG. 2 is a schematic cross-sectional view of a film of another embodiment.

In an embodiment, the substrate layer includes a transparent polyvinyl chloride resin layer and a colored polyvinyl chloride resin layer. In the film of this embodiment, the colored polyvinyl chloride resin layer is supported or protected by the transparent polyvinyl chloride resin layer, and thus durability can be imparted to the decorative characteristics of the film. For example, the film of this embodiment can be used suitably for attaching to an interior material or an exterior material of a structure or a vehicle. A schematic cross-sectional view of a film 100 of this embodiment is illustrated in FIG. 2. The film 100 includes a substrate layer 140 and a substrate layer 142. Other configurations of the film 100 are as described in FIG. 1.

A thickness of the substrate layer can be, for example, approximately greater than or equal to 25 μm, approximately greater than or equal to 50 μm, or approximately greater than or equal to 80 μm, and approximately less than or equal to 5 mm, approximately less than or equal to 1 mm, or approximately less than or equal to 0.5 mm. When the substrate layer is formed of two or more layers, the above-described thickness means the total thickness of the substrate layer.

In some embodiments, a tensile stretching rate of the substrate layer is approximately greater than or equal to 10%, approximately greater than or equal to 20%, or approximately greater than or equal to 30%, and approximately less than or equal to 400%, approximately less than or equal to 350%, or approximately less than or equal to 300%. A sample having a width of 25 mm and a length of 150 mm is prepared and the tensile stretching rate of the substrate layer is a value calculated by [Chuck distance at the time of breaking (mm)−Chuck distance before stretching (mm) (=100 mm)]/Chuck distance before stretching (mm) (=100 mm)×100(%) when the sample is stretched by using a tensile tester at a temperature of 20° C., a tensile speed of 300 mm/min, and a chuck distance of 100 mm until the sample breaks.

The substrate layer may include an adhesive layer opposite to the surface layer. A generally used adhesive such as a solvent-type, emulsion-type, pressure-sensitive type, heat-sensitive type, and heat-curable or ultraviolet-curable type adhesive, including acrylics, polyolefins, polyurethanes, polyesters, rubbers, and the like can be used as the adhesive layer. The thickness of the adhesive layer can typically be approximately greater than or equal to 5 μm, approximately greater than or equal to 10 μm, or approximately greater than or equal to 20 μm, and approximately less than or equal to 100 μm, approximately less than or equal to 80 μm, or approximately less than or equal to 50μ m.

A liner may be imparted to a surface of the adhesive layer. Examples of the liner can include paper; a plastic material such as polyethylene, polypropylene, polyester, and cellulose acetate; and paper coated with such a plastic material. These liners may have a surface subjected to peeling treatment with silicone or the like. The thickness of the liner is typically approximately greater than or equal to 5 μm, approximately greater than or equal to 15 μm, or approximately greater than or equal to 25 μm, and approximately less than or equal to 500 μm, approximately less than or equal to 300 μm, or approximately less than or equal to 250 μm.

The film can be produced by a method including forming a low gloss layer on a substrate, forming a gloss printed pattern on the low gloss layer, the gloss printed pattern partially covering the low gloss layer, and embossing the gloss printed pattern. The substrate may be a peelable liner or may be the substrate layer as described above. When a peelable liner is used as the substrate, the liner can be removed after the above-described steps to obtain a film only including the surface layer.

The film may be a graphic film or may be an over-laminate film to be applied to a decorative surface.

An over-laminate film of an embodiment includes a transparent resin base film including a first surface and a second surface opposite to the first surface, a surface layer disposed on the first surface of the transparent resin base film, and a transparent adhesive layer disposed on the second surface of the transparent resin base film. The surface layer includes a low gloss layer and a gloss printed pattern. The surface layer, the low gloss layer, and the gloss printed pattern are as described above.

In an embodiment, the low gloss layer includes a binder including a resin, resin beads having an average particle size of approximately greater than or equal to 4 μm and approximately less than or equal to 20 μm, and nano-silica particles. The low gloss layer includes the resin beads having an average particle size in the above-described range and the nano-silica particles, and thus low gloss appearance is imparted to the over-laminate film. In this embodiment, design appearance having a high contrast ratio and suppressed visible light reflection of a dark portion is provided. In other words, the dark portion is visually recognized as being darker, and thus, design appearance having a more marked difference between lightness and darkness and having a unique and sharper visual effect.

In an embodiment, the over-laminate film is stretchable. The over-laminate film of this embodiment can be stretched to conform to a shape of an article to which the film is attached. The over-laminate film of some embodiments can maintain low gloss appearance after stretching.

Figure 3:
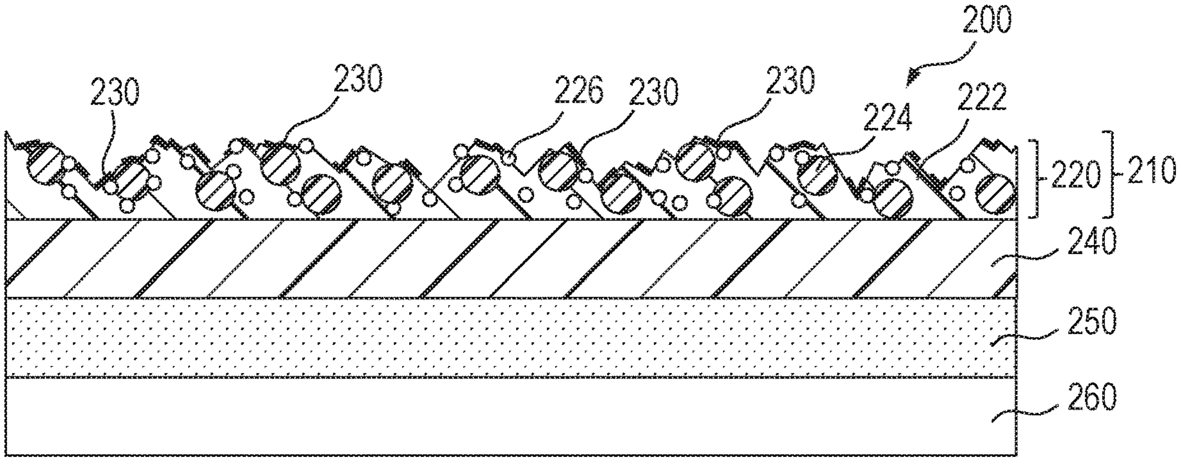
FIG. 3 is a schematic cross-sectional view of a film that is an over-laminate film, according to another embodiment.

A schematic cross-sectional view of an over-laminate film of an embodiment is illustrated in FIG. 3. An over-laminate film 200 of FIG. 3 includes a transparent resin base film 240, a surface layer 210 including a low gloss layer 220 and a gloss printed pattern 230, and a transparent adhesive layer 250, and may include a liner 260 that protects the transparent adhesive layer 250. The low gloss layer 220 include a binder 222 including a resin, resin beads 224 having an average particle size of greater than or equal to 4 μm and less than or equal to 20 μm, and nano-silica particles 226.

Various resin films can be used as the transparent resin base film. The transparent resin base film may be stretchable. As the transparent resin base film, at least one resin film selected from the group consisting of polyvinyl chloride, polyurethane, polyethylene, polypropylene, a vinyl chloride-vinyl acetate resin, an acrylic resin, a cellulose resin, an ionomer resin, a silicone resin, and a fluororesin can be used.

The transparent resin base film may be colored or colorless. The transparent resin base film may include a substantially smooth surface and may include a structured surface that can be formed by surface processing such as embossing. The appearance or the shape of the transparent resin base film is as described above. And thus, various decorative characteristics can be imparted to the over-laminate film.

In an embodiment, total light transmittance of the transparent resin base film in the wavelength range from 400 to 700 nm is approximately greater than or equal to 85%, approximately greater than or equal to 90%, or appropriately greater than or equal to 95%.

The thickness of the transparent resin base film can be, for example, approximately greater than or equal to 25 μm, approximately greater than or equal to 50 μm, or approximately greater than or equal to 80 μm, and approximately less than or equal to 5 mm, approximately less than or equal to 1 mm, or approximately less than or equal to 0.5 mm.

In some embodiments, a tensile stretching rate of the transparent resin base film is approximately greater than or equal to 10%, approximately greater than or equal to 20%, or approximately greater than or equal to 30%, and approximately less than or equal to 400%, approximately less than or equal to 350%, or approximately less than or equal to 300%. A sample having a width of 25 mm and a length of 150 mm is prepared and the tensile stretching rate of the transparent resin base film is a value calculated by [Chuck distance at the time of breaking (mm)−Chuck distance before stretching (mm) (=100 mm)]/Chuck distance before stretching (mm) (=100 mm)×100(%) when the sample is stretched by using a tensile tester at a temperature of 20° C., a tensile speed of 300 mm/min, and a chuck distance of 100 mm until the sample breaks.

A generally used adhesive such as a solvent-type, emulsion-type, pressure-sensitive type, heat-sensitive type, and heat-curable or ultraviolet-curable type adhesive, including acrylics, polyolefins, polyurethanes, polyesters, rubbers, and the like can be used as the transparent adhesive layer. The thickness of the transparent adhesive layer can typically be approximately greater than or equal to 5 μm, approximately greater than or equal to 10 μm, or approximately greater than or equal to 20 μm, and approximately less than or equal to 100 μm, approximately less than or equal to 80 μm, or approximately less than or equal to 50 μm.

In an embodiment, total light transmittance of the transparent adhesive layer in the wavelength range from 400 to 700 nm is approximately greater than or equal to 85%, approximately greater than or equal to 90%, or approximately greater than or equal to 95%.

A liner may be imparted to a surface of the transparent adhesive layer. Examples of the liner include paper; a plastic material such as polyethylene, polypropylene, polyester, and cellulose acetate; and paper coated with such a plastic material. These liners may have a surface subjected to peeling treatment with silicone or the like. The thickness of the liner is typically approximately greater than or equal to 5 μm, approximately greater than or equal to 15 μm, or approximately greater than or equal to 25 μm, and approximately less than or equal to 500 μm, approximately less than or equal to 300 μm, or approximately less than or equal to 250 μm.

In an embodiment, total light transmittance of the over-laminate film in the wavelength range from 400 to 700 nm is approximately greater than or equal to 75%, approximately greater than or equal to 80%, or approximately greater than or equal to 85%.

The thickness of the over-laminate film can typically be approximately greater than or equal to 20 μm, approximately greater than or equal to 50 μm, or approximately greater than or equal to 80 μm, and approximately less than or equal to 500 μm, approximately less than or equal to 250 μm, or approximately less than or equal to 150 μm. The thickness of the over-laminate film refers to the maximum thickness in the film surface, and does not include the thickness of the liner.

A graphic laminate of an embodiment includes a graphic film including a resin base film including a first surface and a second surface opposite to the first surface, a printed layer disposed on the first surface, and an adhesive layer disposed on the second surface, and the over-laminate film of the present disclosure covering the printed layer of the graphic film. The printed layer of the graphic film is covered with the over-laminate film of the present disclosure, and thus low gloss appearance can be imparted to a decorative surface expressed by the printed layer of the graphic film.

Figure 4:
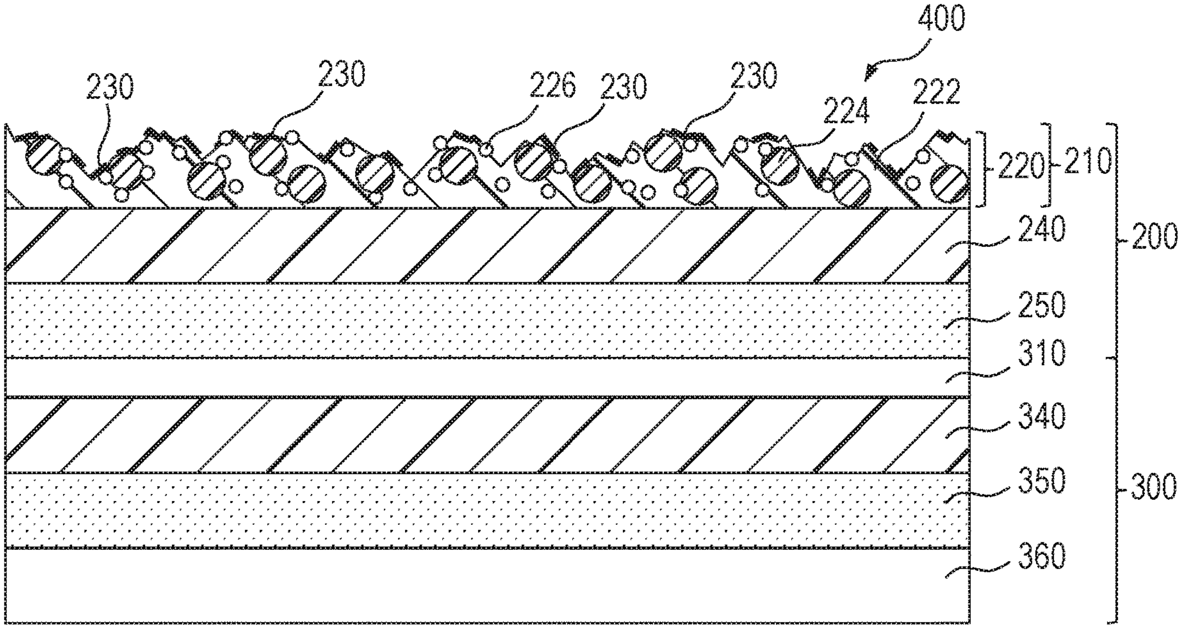
FIG. 4 is a schematic cross-sectional view of a film that is graphic laminate, according to another embodiment.

A schematic cross-sectional view of a graphic laminate of an embodiment is illustrated in FIG. 4. A graphic laminate 400 of FIG. 4 includes a graphic film 300 including a resin base film 340, a printed layer 310, and an adhesive layer 350, and an over-laminate film 200 covering the printed layer 310 of the graphic film 300. The over-laminate film 200 is laminated on the printed layer 310 of the graphic film via the transparent adhesive layer 250. In FIG. 4, a liner 360 that protects the adhesive layer 350 is illustrated.

Various resin films can be used as the resin base film of the graphic film. The resin base film may be stretchable. As the resin base film, at least one resin film selected from the group consisting of polyvinyl chloride, polyurethane, polyethylene, polypropylene, a vinyl chloride-vinyl acetate resin, an acrylic resin, a cellulose resin, an ionomer resin, a silicone resin, and a fluororesin can be used.

The resin base film may be colored or colorless. The resin base film may be opaque, translucent, or transparent. The resin base film may include a substantially smooth surface and may include a structured surface that can be formed by surface processing such as embossing. The appearance or the shape of the resin base film is as described above, and thus various decorative characteristics can be imparted to the graphic laminate.

In an embodiment, the resin base film includes a transparent polyvinyl chloride resin layer and a colored polyvinyl chloride resin layer. In the graphic laminate of this embodiment, the colored polyvinyl chloride resin layer is supported or protected by the transparent polyvinyl chloride resin layer, and thus durability can be imparted to the graphic laminate. For example, the graphic laminate of this embodiment can be used suitably for attachment to an interior material or an exterior material of a structure or a vehicle.

The thickness of the resin base film can be, for example, approximately greater than or equal to 25 μm, approximately greater than or equal to 50 μm, or approximately greater than or equal to 80 μm, and approximately less than or equal to 5 mm, approximately less than or equal to 1 mm, or approximately less than or equal to 0.5 mm.

In some embodiments, a tensile stretching rate of the resin base film is approximately greater than or equal to 10%, approximately greater than or equal to 20%, or approximately greater than or equal to 30%, and approximately less than or equal to 400%, approximately less than or equal to 350%, or approximately less than or equal to 300%. A sample having a width of 25 mm and a length of 150 mm is prepared and the tensile stretching rate of the resin base film is a value calculated by [Chuck distance at the time of breaking (mm)−Chuck distance before stretching (mm) (=100 mm)]/Chuck distance before stretching (mm) (=100 mm)×100(%) when the sample is stretched by using a tensile tester at a temperature of 20° C., a tensile speed of 300 mm/min, and a chuck distance of 100 mm until the sample breaks.

The printed layer disposed on the first surface of the resin base film imparts designability to the graphic film. The printed layer can be formed on the first surface of the resin base film by using a printing technique such as inkjet printing, gravure printing, electrostatic printing, screen printing, and offset printing.

As printing ink, solvent-based ink, water-based ink, or UV curable ink can be used. The printing ink may be transparent, translucent, or opaque, and may be colorless or colored.

The thicknesses of the printed layer may vary, and when solvent-based ink is used, the thickness can typically be approximately greater than or equal to 0.1 μm, approximately greater than or equal to 0.2 μm, or approximately greater than or equal to 0.3 μm and approximately less than or equal to 10 μm or approximately less than or equal to 5 μm. When UV curable ink is used, the thickness can be approximately greater than or equal to 1 μm or approximately greater than or equal to 5 μm, and approximately less than or equal to 50 μm or approximately less than or equal to 30 μm. In the present disclosure, the thickness of the printed layer refers to the thickness of the thickest portion, that is, the maximum thickness.

The printed layer may be continuous or discontinuous. The printed layer may be disposed to correspond to the entire surface of the resin base film or may be disposed to correspond to a portion or a plurality of portions of the surface. The printed layer may cover the entire surface of the resin base film. In an embodiment, the printed layer includes a printed region and an unprinted region. Examples of a design of the printed layer include woodgrain, stone, a logo, a picture, text, and a symbol.

In an embodiment, the printed layer is an inkjet printed layer. Inkjet printing enables on-demand production in a short delivery period.

As the adhesive layer disposed on the second surface of the resin base film, a generally used adhesive such as a solvent-type, emulsion-type, pressure-sensitive type, heat-sensitive type, and heat-curable or ultraviolet-curable type adhesive, including acrylics, polyolefins, polyurethanes, polyesters, rubbers, and the like can be used. The thickness of the adhesive layer can typically be approximately greater than or equal to 5 μm, approximately greater than or equal to 10 μm, or approximately greater than or equal to 20 μm, and approximately less than or equal to 100 μm, approximately less than or equal to 80 μm, or approximately less than or equal to 50 μm.

The adhesive layer may be colored or colorless. The adhesive layer may be opaque, translucent, or transparent. In an embodiment, the adhesive layer is a white adhesive layer including a pigment such as titanium oxide. The white adhesive layer can enhance sharpness of a design expressed by the printed layer and, as necessary, the resin base film.

A liner may be imparted to a surface of the adhesive layer. Examples of the liner include paper; a plastic material such as polyethylene, polypropylene, polyester, and cellulose acetate; and paper coated with such a plastic material. These liners may have a surface subjected to peeling treatment with silicone or the like. The thickness of the liner is typically approximately greater than or equal to 5 μm, approximately greater than or equal to 15 μm, or approximately greater than or equal to 25 μm, and approximately less than or equal to 500 μm, approximately less than or equal to 300 μm, or approximately less than or equal to 250 μm.

Application of the film of the present disclosure is not particularly limited. For example, the film of the present disclosure can be used as an interior material such as a wall, stairs, a ceiling, a pillar, and a partition, or an exterior material such as an outer wall of a structure such as a building, an apartment, and a house. Additionally, the film can be used as an interior material or an exterior material of various vehicles such as a railroad vehicle, a ship, a plane, and an automobile including two wheels or four wheels. Further, the film can also be used as a decoration material of various articles such as a traffic sign, a signboard, furniture, and an electrical appliance.

EXAMPLES

In the following examples, specific embodiments of the present disclosure will be exemplified, but the present invention is not limited to those embodiments. All parts and percent are based on mass unless otherwise specified. A numerical value essentially includes an error derived from a measurement principle and a measuring device. The numerical value is generally indicated by a significant digit that is normally rounded.

Materials and reagents used in the present examples are shown in Table 1.

TABLE 1

Table 1

| Name or abbreviation | Description | Supplier |
|---|---|---|
| Art pearl CE-800T | Urethane resin beads, average particle size: 6 μm | Negami Chemical Industrial Co., Ltd. Nomi-shi, Ishikawa, Japan) |
| MIBK ST L | Nano-silica particles, average particle size: 40 to 50 nm, 30 mass % methyl isobutyl ketone (MIBK) dispersion liquid | Nissan Chemical Industries, Ltd. (Chiyoda-ku, Tokyo, Japan) |
| T5652 | Polycarbonate diol, OH value: 51 to 61 mgKOH/g, viscosity: 7000 to 16000 mPa · s (50° C.) | Asahi Kasei Corporation (Chiyoda-ku, Tokyo, Japan) |
| CAB-381-20 | Cellulose acetate butyrate | Eastman Chemical Company (Kingsport, Tennessee, United States) |
| SILCLEAN 3700 | Hydroxy group-containing silicone-modified polymer | BYK Japan KK (Shinjuku-ku, Tokyo, Japan) |
| D110N | Xylylene diisocyanate | Mitsui Chemicals, Inc. (Minato-ku, Tokyo, Japan) |
| 1-Methoxy-2-propyl acetate | Solvent | Sigma-Aldrich Co. LLC (Saint Louis, Missouri, United States) |
| Transparent polyvinyl chloride film | 0.08 mm-thick calendered film, polyvinyl chloride/ester plasticizer/organic stabilizer (acrylic resin, zinc stearate, and the like) = 79/16/5 (mass ratio). | — |
| Black polyvinyl chloride film | 0.08 mm-thick calendered film, polyvinyl chloride/ester plasticizer/organic stabilizer, pigment and the like (acrylic resin, zinc stearate, carbon black, and the like) = 79/16/5 (mass ratio) | — |
| Gloss ink 1 | Urethane resin ink | DIC Corporation (Itabashi-ku, Tokyo, Japan) |
| Gloss ink 2 | Acrylic resin ink | DIC Corporation (Itabashi-ku, Tokyo, Japan) |
| Matte ink | Silica-containing urethane resin ink | DIC Corporation (Itabashi-ku, Tokyo, Japan) |
| JS1000A | SKU:JR455016840 White PVC film | 3M Japan Limited (Shinagawa-ku, Tokyo, Japan) |
| PET film | Tetron (registered trademark) Film G2, 50 μm in thickness | Toyobo Film Solution Ltd. (Chuo-ku, Tokyo, Japan) |

Surface glossiness of gloss ink 1 (urethane resin ink) used for solid-printing on a PET film was 105 GU/108 GU/101 GU (20 degrees/60 degrees/85 degrees) when JS1000A (white PVC film) was water-laminated on an opposite surface of the PET film.

Surface glossiness of gloss ink 2 (acrylic resin ink) used for solid-printing on a PET film was 104 GU/106 GU/98 GU (20 degrees/60 degrees/85 degrees) when JS1000A was water laminated on an opposite surface of the PET film.

Surface glossiness of mat ink used for solid-printing on a PET film was 1.9 GU/3.8 GU/6.8 GU (20 degrees/60 degrees/85 degrees) when JS1000A (white PVC film) was water-laminated on an opposite surface of the PET film.

Surface glossiness of the PET film was 139 GU/128 GU/101 GU (20 degrees/60 degrees/85 degrees) when JS1000A (white PVC film) was water-laminated on the opposite surface of the PET film.

The surface glossiness (20 degrees/60 degrees/85 degrees) was measured by using a portable glossmeter BYK-Gardner micro-TRI-gloss (BYK Japan KK, Shinjuku-ku, Tokyo, Japan).

Preparation of Low Gloss Layer Coating Composition 15.0 g of Art pearl CE-800T, 8.4 g of T5652, 15.0 of MIBK ST L, 2.1 g of CAB-381-20, 2.52 g of D110N, and 1.2 g of SILCLEAN 3700 were mixed. 59.5 g of 1-methoxy-2-propyl acetate was added to the mixture, and the solid content was adjusted to 32.51 mass %, and then the resultant mixture was stirred for 3.5 minutes by using a self-revolution type centrifugal stirrer THINKY AR-250 (THINKY CORPORATION, Chiyoda-ku, Tokyo, Japan), to obtain a low gloss layer coating composition.

Formation of Low Gloss Layer

A transparent polyvinyl chloride film was heat-laminated to a PET film. The low gloss layer coating composition was applied on the transparent polyvinyl chloride film with a gap of 40 μm by using a knife coater, and the transparent polyvinyl chloride film was left in an oven at a temperature of 65° C. for two minutes to remove a solvent from a coating layer and then was left in an oven at a temperature of 120° C. for 5 minutes to be subjected to heat-curing, and a low gloss layer having a thickness after drying of approximately 12 μm was formed.

Example 1

The PET film laminated to the transparent polyvinyl chloride film including the low gloss layer was peeled off. A gloss printed pattern was formed on the low gloss layer of the transparent polyvinyl chloride film by gravure printing using a gravure plate of woodgrain A (cross grain and straight grain mixed pattern, 133 lines) and the gloss ink 1. Subsequently, a colored polyvinyl chloride film and the transparent polyvinyl chloride film were disposed such that the colored polyvinyl chloride film came into contact with the transparent polyvinyl chloride film. The colored polyvinyl chloride film and the transparent polyvinyl chloride film were heat-laminated such that an embossing roll of a pattern A (woodgrain) came in contact with the gloss printed pattern and the low glossy layer to obtain a graphic film. The heat lamination was performed under the following conditions.

IR temperature: 600° C.
Nip pressure: 0.2 MPa
Embossing roll temperature: 60° C.
Takeoff roll temperature: 170° C.
Heat drum temperature: 130° C.

Example 2

A graphic film was obtained in the same procedure as in Example 1 except that the gravure plate was replaced by a woodgrain B (walnut seed pattern 120 lines) gravure plate.

Example 3

A graphic film was obtained in the same procedure as in Example 1 except that the embossing roll was replaced by a pattern B (sand-like) embossing roll.

Example 4

A graphic film was obtained in the same procedure as in Example 1 except that the gloss ink 1 was replaced by the gloss ink 2.

Comparative Example 1

A graphic film was obtained in the same procedure as in Example 1 except that matte ink was used to print the same matte printed pattern as the gloss printed pattern on a transparent polyvinyl chloride film having no low gloss layer.

Comparative Example 2

A graphic film was obtained in the same procedure as in Example 1 except that the embossing roll was replaced by a pattern C (satin-like) embossing roll.

Comparative Example 3

A graphic film was obtained in the same procedure as in Example 1 except that no gloss printed pattern was formed.

Production conditions and construction of the graphic films of Examples 1 to 4 and Comparative Examples 1 to 3 are shown in Table 2.

TABLE 2

Table 2

| | Printed pattern | Ink | Embossing roll | Graphic film construction |
|---|---|---|---|---|
| Example 1 | Woodgrain A | Gloss ink 1 | A | Gloss printed pattern/low gloss layer/transparent PVC film/black PVC film |
| Example 2 | Woodgrain B | Gloss ink 1 | A | Gloss printed pattern/low gloss layer/transparent PVC film/black PVC film |
| Example 3 | Woodgrain A | Gloss ink 1 | B | Gloss printed pattern/low gloss layer/transparent PVC film/black PVC film |

TABLE 2-continued

| Table 2 | | | | |
|---|---|---|---|---|
| | Printed pattern | Ink | Embossing roll | Graphic film construction |
| Example 4 | Woodgrain A | Gloss ink 2 | A | Gloss printed pattern/low gloss layer/transparent PVC film/black PVC film |
| Comparative Example 1 | (Wood grain A) | (Matte ink) | A | Matte printed pattern/transparent PVC film/black PVC film |
| Comparative Example 2 | Woodgrain A | Gloss ink 1 | C | Gloss printed pattern/low gloss layer/transparent PVC film/black PVC film |
| Comparative Example 3 | — | — | A | Low gloss layer/transparent PVC film/black PVC film |

85-Degree Surface Glossiness (In-Plane Average Value and in-Plane Maximum Value)

85-degree surface glossiness was measured by using a portable glossmeter BYK-Gardner micro-TRI-gloss (BYK Japan KK, Shinjuku-ku, Tokyo, Japan) in accordance with the following procedure.

An in-plane average value of the 85-degree surface glossiness was an average value of measurements at 5 points in total: one point in the center of a sample of approximately 300 mm in length and approximately 400 mm in width, and the center of each of four regions obtained by dividing the sample into four regions (divided vertically into two regions and horizontally into two regions) through the center of the sample. At each measurement point, the 85-degree surface glossiness was measured in accordance with the following procedure.

(1) A reference line in an arbitrary direction that passes through the measurement point is set.

(2) The 85-degree surface glossiness is measured in six directions at angles of 0 degree, 30 degrees, 60 degrees, 90 degrees, 120 degrees, and 150 degrees from the set reference line.

(3) A maximum value of measured values in the six directions is adopted as a value at the measurement point.

As for an in-plane maximum value of the 85-degree surface glossiness, a sample of approximately 300 mm in length and approximately 400 mm in width was divided into four regions (divided vertically into two regions and horizontally into two regions) through the center of the sample. In each region, a location having the highest glossiness was visually determined as a first measurement point at which the 85-degree surface glossiness was measured in accordance with the following procedure.

(1) A first reference line in an arbitrary direction that passes through the first measurement point is set.

(2) The 85-degree surface glossiness is measured in six directions at angles of 0 degree, 30 degrees, 60 degrees, 90 degrees, 120 degrees, and 150 degrees from the set first reference line.

(3) A maximum value of measured values in the six directions is adopted as a value at the first measurement point.

(4) A second reference line is set in the direction of the angle at which the maximum value is measured to pass through the first measurement point, and additionally, a third reference line is set in the direction orthogonal to the second reference line to pass through the first measurement point.

(5) A total of four points, two points 20 mm apart from the first measurement point on the second reference line and two points 5 mm apart from the first measurement point on the third reference line, are determined as second measurement points at which the 85-degree surface glossiness is measured in the direction parallel to the second reference line.

(6) A maximum value of values measured at the first measurement point and the second measurement points (5 points/region×4 regions=maximum value of 20 points) was adopted as the in-plane maximum value.

Δ85-Degree surface glossiness

Δ85-degree surface glossiness was determined by subtracting the in-plane average value from the in-plane maximum value of the 85-degree surface glossiness. When the Δ85-degree surface glossiness is approximately less than or equal to 2.5 GU, glare due to a change in a viewing angle can be suppressed. When the Δ85-degree surface glossiness is greater than or equal to 0.2 GU, a pattern formed by the gloss printed pattern can be recognized visually, and a design having fineness and a stereoscopic effect can be expressed.

Surface Roughness Ra and Maximum Height Rz

The surface roughness Ra and the maximum height Rz of the embossed surface of the graphic film were measured by using a digital microscope DSX510 (Olympus Corporation, Shinjuku-ku, Tokyo, Japan). The surface roughness Ra and the maximum height Rz are arithmetic average roughness and the maximum height, respectively, measured in accordance with line roughness of JIS B 0601:2001.

Slope from Approximate Line of Visible Light Ray Reflectance

Slope of an approximate line of visible light ray reflectance of the graphic film was measured by using a spectrophotometric type variable angle color difference meter GC5000 (Nippon Denshoku Industries Co., Ltd., Bunkyo-ku, Tokyo, Japan). Specifically, visible light ray reflectance at a reflection angle from −80 degrees to 80 degrees was measured by a 5-degree distance when the incident light was set to 60 degrees. Reflectance at from 400 to 800 nm at each angle was averaged to determine the visible light ray reflectance at the angle. The visible light ray reflectance was graphed in the reflection angle range from −80 degrees to 80 degrees, and the slope was calculated from the visible light ray reflectance at two adjacent measurement angles. When a maximum value of the slope is greater than or equal to 3.5 (%/5 degrees), the visible light ray reflectance significantly changes due to a slight change in a viewing angle from a certain viewing angle. In other words, this means that glare is observed at an angle around the viewing angle.

Appearance

A sample having low gloss entirely, and stereoscopically expressing a woodgrain pattern was evaluated as good, and a sample partially having glare of gloss or a sample expressing no visible woodgrain pattern was evaluated as poor.

Tactility

A 10 cm-square graphic film including a surface entirely embossed was disposed on a flat surface. Tactility was evaluated by rubbing and touching the vicinity of the center on the surface side with pads of three or more fingers including a forefinger, a middle finger, and an annular finger at a rate of two times of reciprocation in a distance of about 5 cm for about one second under a load of approximately 200 g. A sample including an embossed pattern having orientation (such as woodgrain creases) was evaluated in a direction orthogonal to the orientation. A sample clearly having a feel of unevenness or roughness of a surface was evaluated as good, a sample having a feel of unevenness or roughness of a surface was evaluated as acceptable, and a sample scarcely having a feeling of unevenness or roughness of a surface was evaluated as poor.

The evaluation results of the graphic films are shown in Table 3.

TABLE 3

| | 85-degree surface glossiness [GU] | | Δ85-degree surface glossiness | Slope from approximate line of visible light ray | Surface roughness Ra | Maximum height Rz | | |
|---|---|---|---|---|---|---|---|---|
| | Average | Maximum | [GU] | reflectance | [μm] | [μm] | Appearance | Tactility |
| Example 1 | 2.18 | 2.60 | 0.42 | 0.6 | 17.7 | 76.5 | Good | Good |
| Example 2 | 2.14 | 2.70 | 0.56 | 0.5 | 17.7 | 76.5 | Good | Good |
| Example 3 | 1.44 | 1.80 | 0.36 | 0.6 | 5.0 | 32.9 | Good | Acceptable |
| Example 4 | 2.64 | 3.20 | 0.56 | 0.6 | 17.7 | 76.5 | Good | Good |
| Comparative Example 1 | 3.60 | 7.30 | 3.70 | 3.9 | 17.7 | 76.5 | Poor | Good |
| Comparative Example 2 | 3.22 | 3.70 | 0.48 | 0.7 | 2.2 | 25.6 | Good | Poor |
| Comparative Example 3 | 1.62 | 1.80 | 0.18 | — | 17.7 | 76.5 | Poor | Good |

Figure 5A:
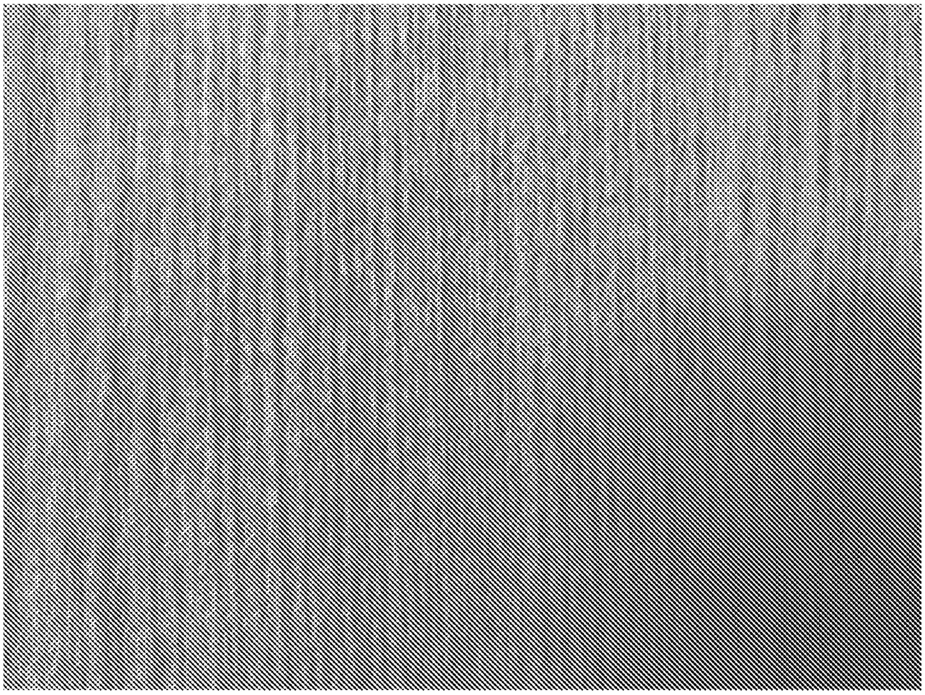
FIG. 5A is a photograph of a film of Example 1 when the film is observed under a fluorescent lamp from the vertical direction of the surface layer side.
Figure 5B:
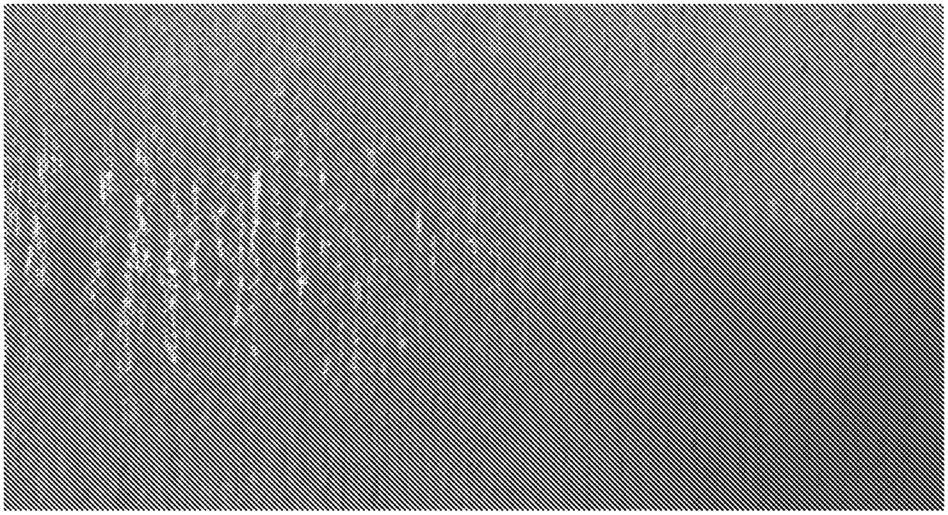
FIG. 5B is a photograph of a film of Comparative Example 1 when the film is observed under a fluorescent lamp from the vertical direction of the surface layer side.

FIG. 5A is a photograph of the film of Example 1 when the film was observed under a fluorescent lamp from the vertical direction of the surface layer side, and FIG. 5B is a photograph of the film of Comparative Example 1 when the film was observed under a fluorescent lamp from the vertical direction of the surface layer side.

Figure 6:
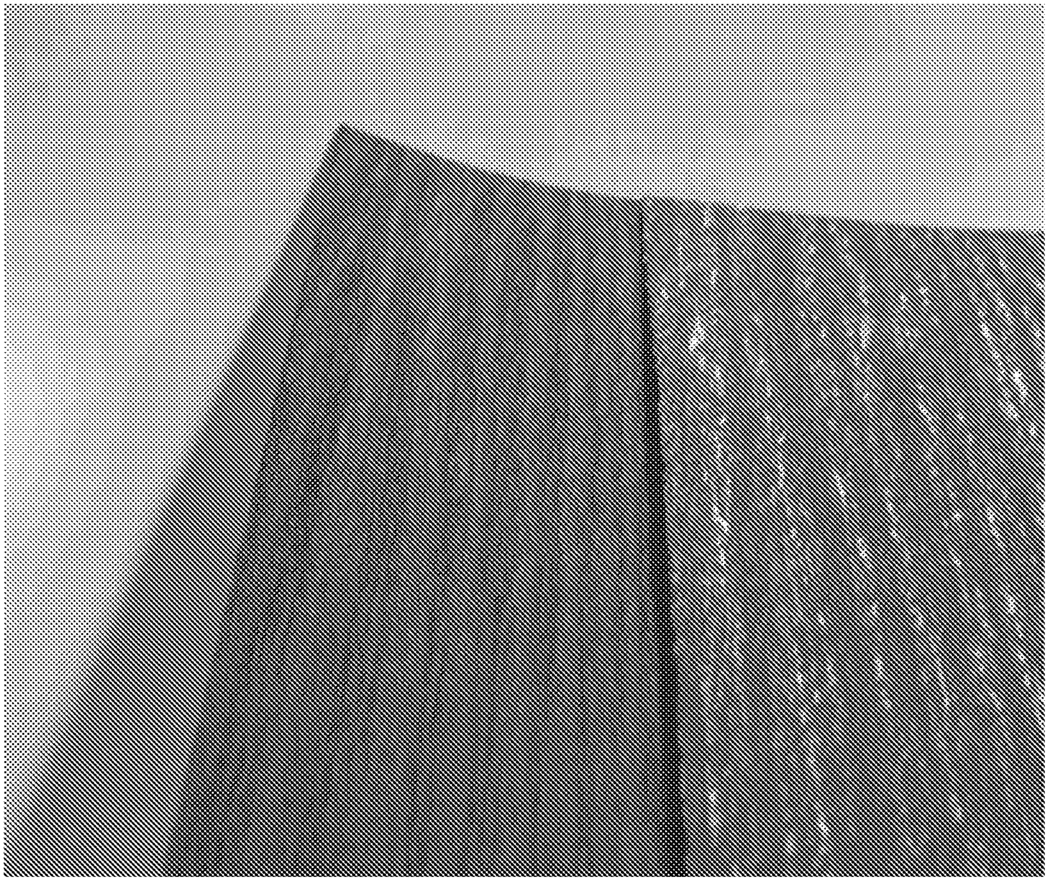
FIG. 6 is a photograph of the films of Example 1 (left) and Comparative Example 1 (right) when the films are observed under a fluorescent lamp at a viewing angle of approximately 30 degrees from the vertical direction of the surface layer side.

FIG. 6 is a photograph of the films of Example 1 (left) and Comparative Example 1 (right) when the films are observed under a fluorescent lamp at a viewing angle of approximately 30 degrees from the vertical direction of the surface layer side.

Figure 7A:
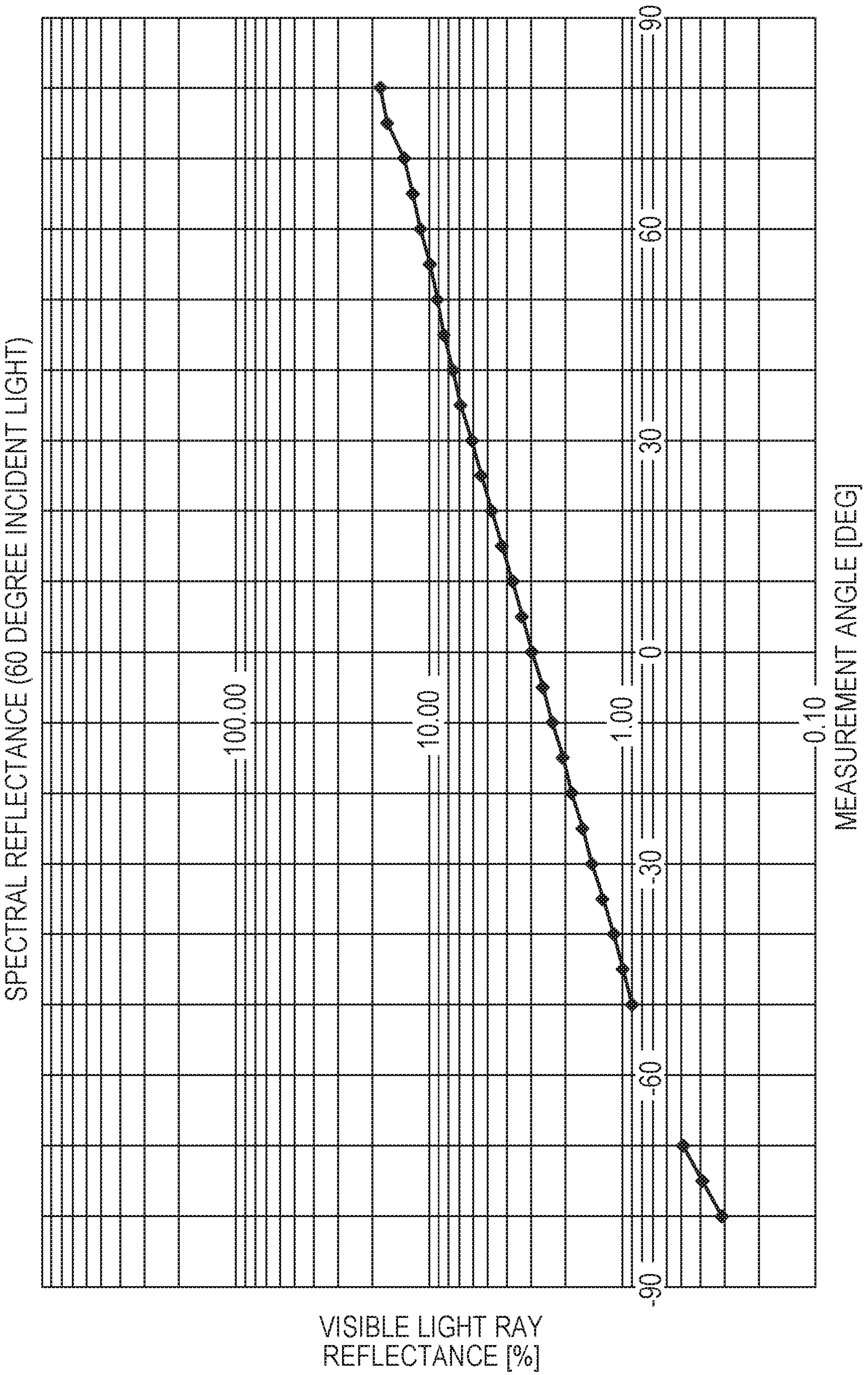
FIG. 7A shows visible light ray reflectance at a reflection angle from −80 degrees to 80 degrees of the film of Example 1 when incident light is set to 60 degrees.
Figure 7B:
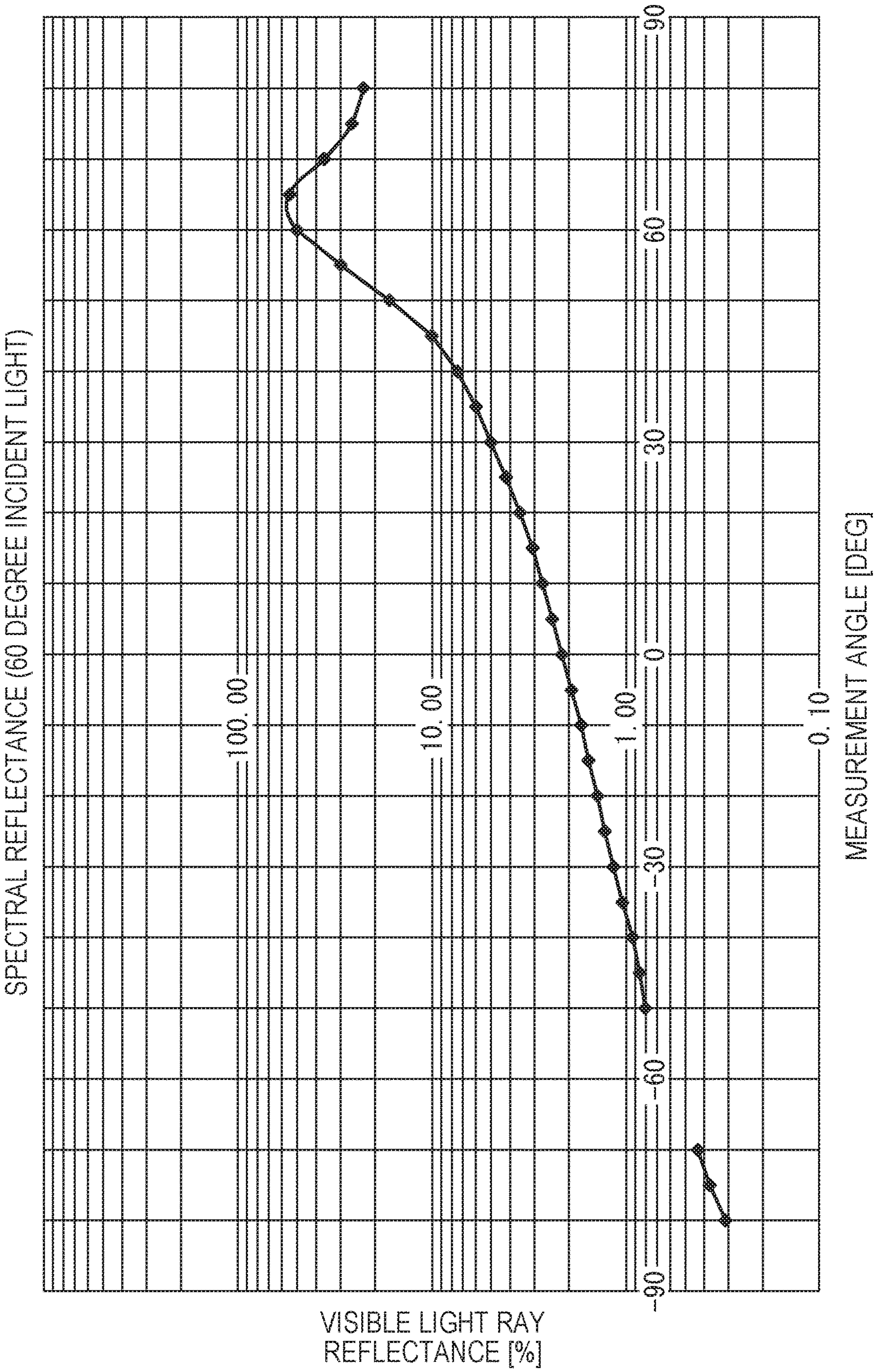
FIG. 7B shows visible light ray reflectance at a reflection angle from −80 degrees to 80 degrees of the film of Comparative Example 1 when incident light is set to 60 degrees.

FIG. 7A shows visible light ray reflectance of the film of Example 1 having a reflection angle from −80 degrees to 80 degrees when incident light is set to 60 degrees, and FIG. 7B shows visible light ray reflectance of the film of Comparative Example 1 having a reflection angle from −80 degrees to 80 degrees when incident light is set to 60 degrees. Although no peak is observed in Example 1, a peak is observed at the reflection angle of 60 degrees in Comparative Example 1. This peak means strong glare when the film is observed at the reflection angle of 60 degrees. Accordingly, in the film of Example 1, no glare is generated at any viewing angle, and stable low gloss appearance is entirely achieved. Note that in the measurement, no measured value can be obtained at −60 degrees at which an angle of a light source coincides with an angle of a detector, and thus, the curve becomes discontinuous at a reflection angle of −60 degrees in both FIG. 7A and FIG. 7B.

It is obvious to a person skilled in the art that various modifications and variations of the present invention can be made without departing from the scope and spirit of the present invention.

REFERENCE SIGNS LIST

100 Film
110, 210 Surface layer
120, 220 Low gloss layer
122, 222 Binder
124, 224 Resin bead
126, 226 Nano-silica particles
130, 230 Gloss printed pattern
140, 142 Substrate layer
150 Adhesive layer
200 Over-laminate film
240 Transparent resin base film
250 Transparent adhesive layer
260, 360 Liner
300 Graphic film
310 Printed layer
340 Resin base film
350 Adhesive layer
400 Graphic laminate

The invention claimed is:

1. A film comprising a surface layer embossed, wherein the surface layer comprises a low gloss layer and a gloss printed pattern partially covering the low gloss layer, and the surface layer is formed by forming the gloss printed pattern on the low gloss layer and then embossing the gloss printed pattern, (1) 85-degree surface glossiness of the surface layer is less than or equal to 5.0 GU as an in-plane average value, (2) Δ85-degree surface glossiness defined by a difference between an in-plane maximum value of the 85-degree surface glossiness and the in-plane average value of the 85-degree surface glossiness of the surface layer (=in-plane maximum value of 85-degree surface glossiness-in-plane average value of 85-degree surface glossiness) is from 0.2 to 2.5, and (3) surface roughness Ra of an embossed surface of the film is greater than or equal to 3.5 μm and a maximum height Rz is greater than or equal to 30 μm.

2. The film according to claim 1, wherein both the low gloss layer and the gloss printed pattern are embossed.

3. The film according to claim 1, wherein at least a portion of the gloss printed pattern is distributed at a bottom portion of the surface layer embossed.

4. The film according to claim 1, comprising a portion where the gloss printed pattern and a pattern of the embossing are not synchronized.

5. The film according to claim 1, wherein the gloss printed pattern includes gloss ink selected from the group consisting of acrylic ink and urethane ink.

6. The film according to claim 1, wherein the gloss printed pattern is a printing pattern by a printing plate.

7. The film according to claim 1, wherein the low gloss layer includes a binder including a resin, resin beads having an average particle size of greater than or equal to 4 μm and less than or equal to 20 μm, and nano-silica particles.

8. The film according to claim 7, wherein an average particle size of the nano-silica particles is from greater than or equal to 10 nm and less than or equal to 100 nm.

9. The film according to claim 7, wherein the low gloss layer includes greater than or equal to 5 parts by mass and less than or equal to 120 parts by mass of the nano-silica particles based on 100 parts by mass of the binder.

10. The film according to claim 7, wherein the low gloss layer includes greater than or equal to 70 parts by mass and less than or equal to 240 parts by mass of the resin beads based on 100 parts by mass of the binder.

11. The film according to claim 7, wherein the binder includes a urethane resin.

12. The film according to claim 11, wherein the urethane resin includes a cured product of a two-part urethane resin composition.

13. The film according to claim 7, wherein the resin beads are urethane resin beads.

14. The film according to claim 7, wherein the binder further includes cellulose ester.

* * * * *